(12) United States Patent
Iikawa et al.

(10) Patent No.: US 6,631,035 B2
(45) Date of Patent: Oct. 7, 2003

(54) VARIFOCAL LENS BARREL AND A LENS DRIVE MECHANISM

(75) Inventors: Makoto Iikawa, Saitama (JP); Takuji Hamasaki, Saitama (JP)

(73) Assignee: Pentax Corporation, Tokyo (JP)

( * ) Notice: Subject to any disclaimer, the term of this patent is extended or adjusted under 35 U.S.C. 154(b) by 29 days.

(21) Appl. No.: 10/067,399

(22) Filed: Feb. 7, 2002

(65) Prior Publication Data

US 2002/0114087 A1 Aug. 22, 2002

(30) Foreign Application Priority Data

Feb. 9, 2001 (JP) .......................... 2001-33302

(51) Int. Cl.[7] .............................. G02B 15/14; G02B 7/02
(52) U.S. Cl. ...................... 359/699; 359/700; 359/704; 359/826
(58) Field of Search ................... 359/694, 699, 359/700, 701, 703, 704, 822, 825, 826

(56) References Cited

U.S. PATENT DOCUMENTS 5,225,938 A * 7/1993 Nomura ...................... 359/699
6,204,977 B1 * 3/2001 Iwasa ........................ 359/700
6,333,825 B1   12/2001 Hamasaki et al.

* cited by examiner

Primary Examiner—Georgia Epps
Assistant Examiner—Darryl J. Collins
(74) Attorney, Agent, or Firm—Greenblum & Bernstein, P.L.C.

(57) ABSTRACT

A varifocal lens barrel includes movable lens groups including a focusing lens group which is moved by different amounts of movement at different focal lengths, a focus operation ring, a focus lens frame which supports the focusing lens group, a guide ring positioned around the focus lens frame, a bottomed focusing cam groove formed on the focus lens frame or the guide ring, a spherical follower which is supported by the focus lens frame or the guide ring, a biasing member for pressing the spherical follower against the bottomed focusing cam groove, and an adjustment mechanism which varies a relative moving range of the spherical follower in the bottomed focusing cam groove in accordance with a variation of the focal length to vary an amount of movement of the focusing lens group per unit of rotation of the focus operation ring.

40 Claims, 22 Drawing Sheets

US 6,631,035 B2

VARIFOCAL LENS BARREL AND A LENS DRIVE MECHANISM

BACKGROUND OF THE INVENTION

1. Field of the Invention

The present invention relates to a varifocal lens barrel and a lens drive mechanism which can be used for the varifocal lens barrel.

2. Description of the Related Art

In an optical device, such as a photographing lens, a construction is known wherein in order to move lens groups thereof in the optical axis direction to perform focusing, etc., a set of cam tracks are formed on one of a pair of relatively rotatable ring members, and a set of followers are formed on the other of the pair of relatively rotatable ring members. The two ring members move relative to each other in the optical axis direction while rotating about the optical axis relative to each other via engagement of the cam tracks with the followers. There are cam track constructions known in the art such as a construction having cam grooves and followers respectively engaged in the cam grooves, and a construction having elongated protrusions having cam faces and followers respectively engaged with the cam faces. If such a construction is used in an optical device such as a photographing lens, play between the cam grooves or faces and the followers becomes a cause of tilt, eccentricity and/or axial positional deviation of a lens group or lens groups. Accordingly, it is desirable to reduce such play as much as possible while ensuring a smooth movement of each follower pin relative to the associated cam groove or cam face to achieve a stable image performance. Each follower preferably slides on the associated cam groove or cam face as smoothly as possible to ensure proper and precise movement of a lens group or lens groups.

A varifocal lens which requires slight focus adjustment when zooming, unless focused on infinity, is known in the art. In a varifocal lens, an axial position of the focusing lens group to focus on an object at a fixed distance slightly varies if the focal length is changed. In a varifocal lens of an AF (autofocus) lens-shutter camera, an axial position of the focusing lens group from the standby position thereof to focus on the object only needs to be determined so as to compensate for such a slight focus variation. On the other hand, in a varifocal lens of an MF (manual focus) SLR camera, such a slight focus variation can be adjusted by turning a focus ring while viewing an image of the object through the viewfinder; accordingly, in general use, such a slight focus variation is not a substantial obstacle to focusing operation itself.

However, a distance ring of a varifocal lens used for SLR cameras needs to be provided thereon with a distance scale for the photographer to read, so that an object at a distance indicated by the distance scale must be brought into focus at any set focal length. In other words, when focusing on an object at a fixed distance, the varifocal lens needs to bring the object into focus by moving the focusing lens group from the standby position thereof by different amounts of movement at different focal lengths, respectively, by turning the distance ring by the same amount of rotation from the infinite position thereof. Accordingly, in terms of a focal length varying operation, a varifocal lens used for SLR cameras is required to have a function to vary the focal length without disturbing focus, similar to that of a zoom lens. The structure of this type of varifocal lens is generally complicated; furthermore, it is difficult to eliminate interference between a focus cam, which is used for changing an amount of movement of the focusing lens group from the standby position thereof per unit of rotation angle of the distance ring in accordance with a variation of focal length, and a zoom cam for zooming operation. Even if interference between the focus cam and the zoom cam is eliminated, the image performance of the varifocal lens is sensitive to tilt, eccentricity and axial positional deviation of the focusing lens group. Therefore, it is desirable to reduce play in a support/guide mechanism for the focusing lens group as small as possible to stabilize the image performance of the varifocal lens and to move the focusing lens group as smooth as possible.

SUMMARY OF THE INVENTION

The present invention provides a varifocal lens barrel in which tilt, eccentricity and axial positional deviation of a focusing lens group is prevented from occurring while a smooth movement of the focusing lens group is ensured to thereby achieve a stable image performance.

The present invention also provides a lens drive mechanism having two rotating rings rotatable relative to each other in an optical device such as a photographing lens, wherein tilt, eccentricity and axial positional deviation of a movable lens group (e.g., a focusing lens group of a varifocal lens) are prevented from occurring while a smooth movement of the focusing lens group is ensured to thereby achieve a stable image performance.

For example, in an embodiment, a varifocal lens barrel is provided, including a varifocal optical system having a plurality of movable lens groups which are driven to move in the optical axis direction to vary a focal length, wherein the plurality of movable lens groups include a focusing lens group which is moved by different amounts of movement at different focal lengths, respectively, when focusing on an object at a fixed distance; a focus operation ring which is manually rotatable; a focus lens frame which supports the focusing lens group, the focus lens frame being rotated via rotation of the focus operation ring; a guide ring positioned around the focus lens frame; a bottomed focusing cam groove having a non-linear contour which is formed on one of an outer peripheral surface of the focus lens frame and an inner peripheral surface of the guide ring; a spherical follower which is supported by the other of the outer peripheral surface of the focus lens frame and the inner peripheral surface of the guide ring, the spherical follower being movable in a radial direction of the focus lens frame and the guide ring and slidably engaged in the bottomed focusing cam groove so as to move the focus lens frame in the optical axis direction in accordance with the non-linear contour when the focus lens frame is rotated by rotation of the focus operation ring; a biasing member for pressing the spherical follower against the bottomed focusing cam groove; and an adjustment mechanism which varies a relative moving range of the spherical follower in the bottomed focusing cam groove, in a circumferential direction of the guide ring, in accordance with a variation of the focal length to vary an amount of movement of the focusing lens group per unit of rotation of the focus operation ring in accordance with the focal length.

The varifocal lens barrel can further include a zoom operation ring which is manually rotatable independently of the focus operation ring; an intermediate movable frame which supports the focusing lens group via the guide ring, the intermediate movable frame being guided in the optical axis direction without rotating about the optical axis; and a zoom drive ring which moves the plurality of movable lens groups and the intermediate movable frame in the optical axis direction in a predetermined moving pattern via rotation of the zoom operation ring. The adjustment mechanism includes a rotation transfer member via which rotation of the zoom drive ring is transferred to the guide ring to rotate the zoom drive ring and the guide ring together about the optical axis while allowing the guide ring to move in the optical axis direction relative to the zoom drive ring; an adjustment cam portion having a non-linear contour which is formed on one of opposed peripheral surfaces of the intermediate movable frame and the guide ring, the non-linear contour of the adjustment cam portion being to the same as the non-linear contour of the bottomed focusing cam groove; and an adjustment follower formed on the other of the opposed peripheral surfaces of the intermediate movable frame and the guide ring to be engaged with the adjustment cam portion. The guide ring rotates about the optical axis while moving in the optical axis direction relative to each of the focus lens frame and the intermediate movable frame by same angle of rotations about the optical axis and by same amounts of movement in the optical axis direction to thereby vary the position of engagement of the spherical follower with respect to the bottomed cam groove when the adjustment follower and the spherical follower are positioned at a common circumferential position relative to the adjustment cam portion and the bottomed cam groove, respectively.

The varifocal lens barrel can further include a stationary barrel which supports the zoom drive ring so that the zoom drive ring moves in the optical axis direction when rotated about the optical axis relative to the stationary barrel. The zoom drive ring supports the intermediate movable frame so that the intermediate movable frame is rotatable about the optical axis relative to the zoom drive ring without moving in the optical axis direction relative to the zoom drive ring.

The bottomed focusing cam groove can be formed on an outer peripheral surface of the focus lens frame, and the spherical follower can be provided on an inner peripheral surface of the guide ring.

It is desirable for there to be three bottomed cam grooves arranged at equi-angular intervals in the circumferential direction, three spherical followers arranged to correspond to the three bottomed focusing cam grooves, and three biasing members arranged to correspond to the three spherical followers.

The bottomed focusing cam groove can be formed to have a trapezoidal cross section so that a width of the each the bottomed focusing cam groove increases in a radial outward direction.

The bottomed focusing cam groove can be formed to have a V-shaped cross section so that a width of the each the bottomed focusing cam groove increases in a radial outward direction.

The bottomed focusing cam groove can be formed to have a circular arc cross section so that a width of the each the bottomed focusing cam groove increases in a radial outward direction.

The biasing member can be a helical spring which is supported by one of the guide ring and the focus lens frame which supports the spherical follower.

The biasing member can be a cantilever leaf spring, wherein one end of the cantilever leaf spring is fixed to one of the guide ring and the focus lens frame which supports the spherical follower.

The biasing member can be a leaf spring, wherein opposite ends of the leaf spring are fixed to one of the guide ring and the focus lens frame which supports the spherical follower.

The one of the guide ring and the focus lens frame which supports the spherical follower can include a holding portion which holds the one end of the cantilever leaf spring.

The one of the guide ring and the focus lens frame which supports the spherical follower can include two holding portions which hold the opposite ends of the leaf spring, respectively.

The biasing member can be a leaf spring portion which is formed integral with the one of the guide ring and the focus lens frame which supports the at least one spherical follower.

The spherical follower can be made of metal or synthetic resin. The biasing member can be made of metal or synthetic resin.

The bottomed focusing cam groove can be formed integral with the one of the guide ring and the focus lens frame which supports the spherical follower, when the one of the guide ring and the focus lens frame which supports the spherical follower is molded of synthetic resin.

It is desirable for at least the bottomed focusing cam groove to be made of metal.

In another embodiment, a lens drive mechanism is provided which moves a movable lens frame supporting a movable lens group in the optical axis direction by a relative rotation between the movable lens frame and a guide ring which are coaxially arranged, the lens drive mechanism including a radial hole formed on one of the guide ring and the movable lens frame; a spherical follower inserted into the radial hole, the spherical follower being slidable in the radial hole; a guide groove formed on the other of the guide ring and the movable lens frame; and a biasing member which biases the spherical follower in a direction to come into pressing contact with the guide groove.

The guide groove can include an operating portion which has a non-linear contour.

Alternatively, the guide groove can include an operating portion which has a linear contour.

The lens drive mechanism can include three guide grooves arranged at regular intervals in a circumferential direction, three spherical followers arranged at regular intervals in a circumferential direction, and three biasing members arranged at regular intervals in a circumferential direction.

The guide groove can be formed so as to have a trapezoidal cross section, so that a width of the guide groove increases in a radial outward direction.

The guide groove can be formed so as to have a V-shaped cross section, so that a width of the guide groove increases in a radial outward direction.

The guide groove can be formed so as to have a circular arc cross section, so that a width of the guide groove increases in a radial outward direction.

The biasing member can be a helical spring which is supported by one of the guide ring and the movable lens frame which supports the spherical follower.

The biasing member can be a cantilever leaf spring, one end of which being fixed to one of the guide ring and the movable lens frame which supports the spherical follower.

The biasing member can be a leaf spring, wherein the opposite ends of the leaf spring are fixed to one of the guide ring and the movable lens frame which supports the spherical follower.

The one of the guide ring and the movable lens frame which supports the spherical follower can include a holding portion which holds the one end of the cantilever leaf spring.

The one of the guide ring and the movable lens frame which supports the spherical follower can include two holding portions which hold the opposite ends of the leaf spring, respectively.

The biasing member can be a leaf spring portion which is formed integral with the one of the guide ring and the movable lens frame which supports the spherical follower.

The guide groove can be formed on the movable lens frame, and the spherical follower can be provided on the guide ring.

The spherical follower can be made of metal or synthetic resin. The biasing member can be made of metal or synthetic resin.

The guide groove can be formed integral with the one of the guide ring and the movable lens frame which supports the spherical follower if the one of the guide ring and the movable lens frame which supports the spherical follower is molded with synthetic resin.

It is desirable for at least the guide groove to be made of metal.

The present disclosure relates to subject matter contained in Japanese Patent Application No.2001-33302 (filed on Feb. 9, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
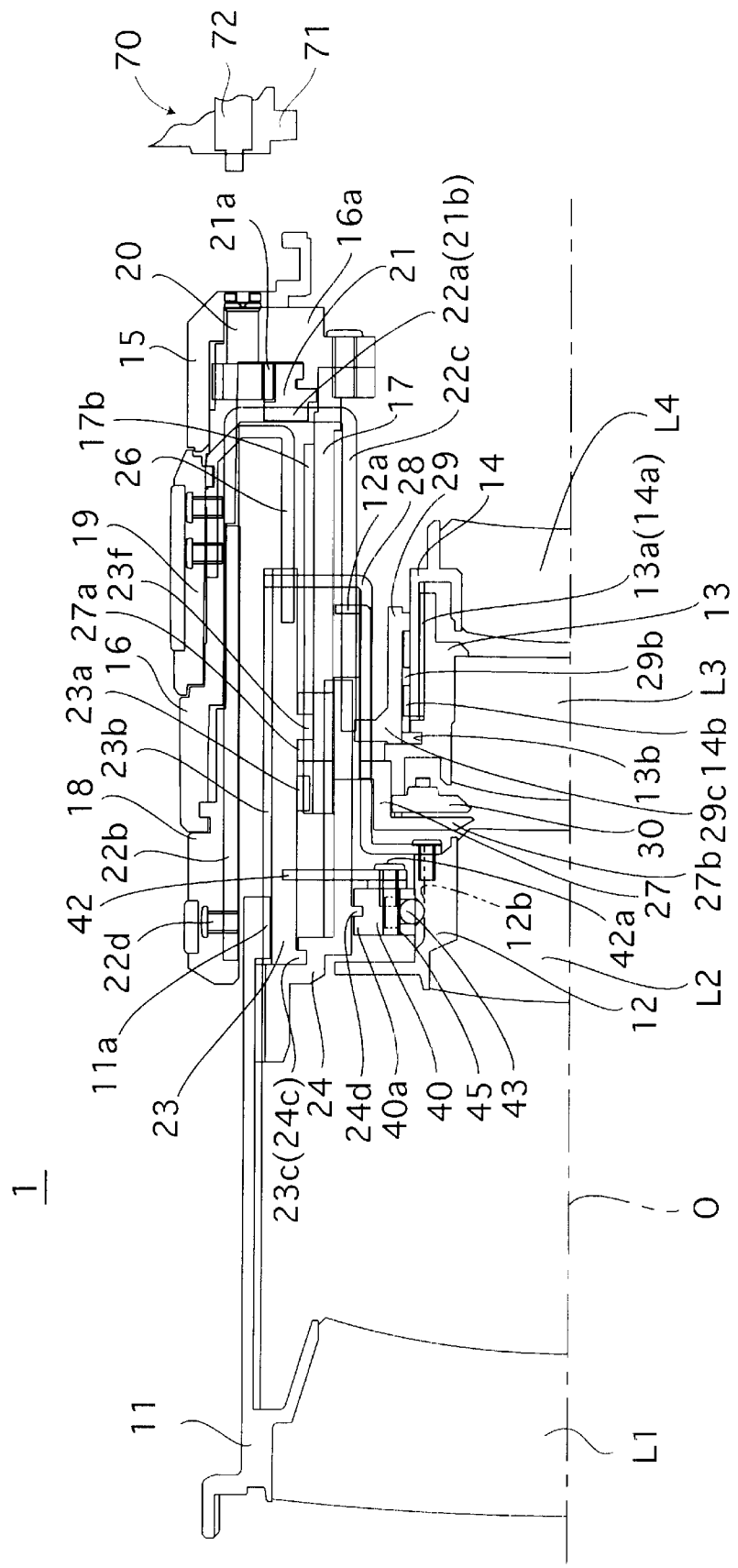
FIG. 1 is an axial cross sectional view of an embodiment of a varifocal lens barrel according to the present invention, showing the varifocal lens barrel above the optical axis thereof, when the focal length is set to telephoto extremity.
Figure 2:
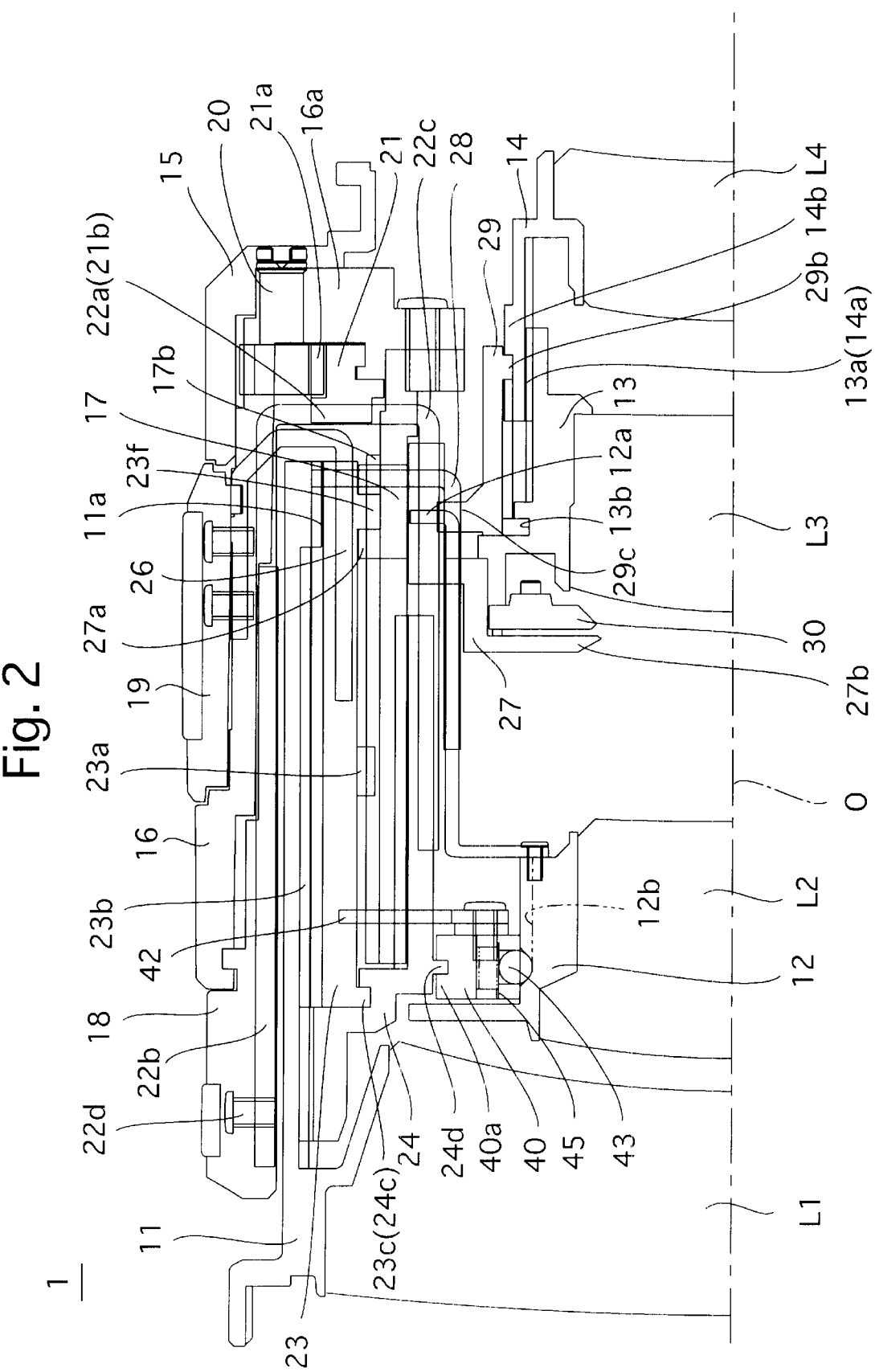
FIG. 2 is an axial cross sectional view of the varifocal lens barrel shown in FIG. 2, showing the varifocal lens barrel above the optical axis thereof, when the focal length is set to wide-angle extremity.

As shown in FIGS. 1 and 2, an embodiment of a varifocal lens barrel to which the present invention is applied, i.e., a varifocal lens barrel 1, is designed as an interchangeable lens of an SLR camera system, and is provided with a varifocal optical system consisting of four lens groups: a first lens group L1, a second lens group (focusing lens group/movable lens group) L2, a third lens group L3 and a fourth lens group L4 in that order from the object side (the left side as viewed in FIG. 1). The first lens group L1, the second lens group L2, the third lens group L3 and the fourth lens group L4 are directly supported by a first lens frame (lens support ring) 11, a second lens frame (lens support ring/movable lens frame) 12, a third lens frame (lens support ring) 13 and a fourth lens frame (lens support ring) 14, respectively. Each of the first through fourth lens groups L1, L2, L3 and L4 is driven to move along an optical axis O while varying the respective distances thereamong to perform zooming operation. The second lens group L2 serves not only as a lens group of a varifocal optical system but also as a focusing lens group. When a focusing operation is carried out, only the second lens group L2, among the four lens groups, is driven to move along the optical axis O while rotating about the optical axis O.

Figure 3:
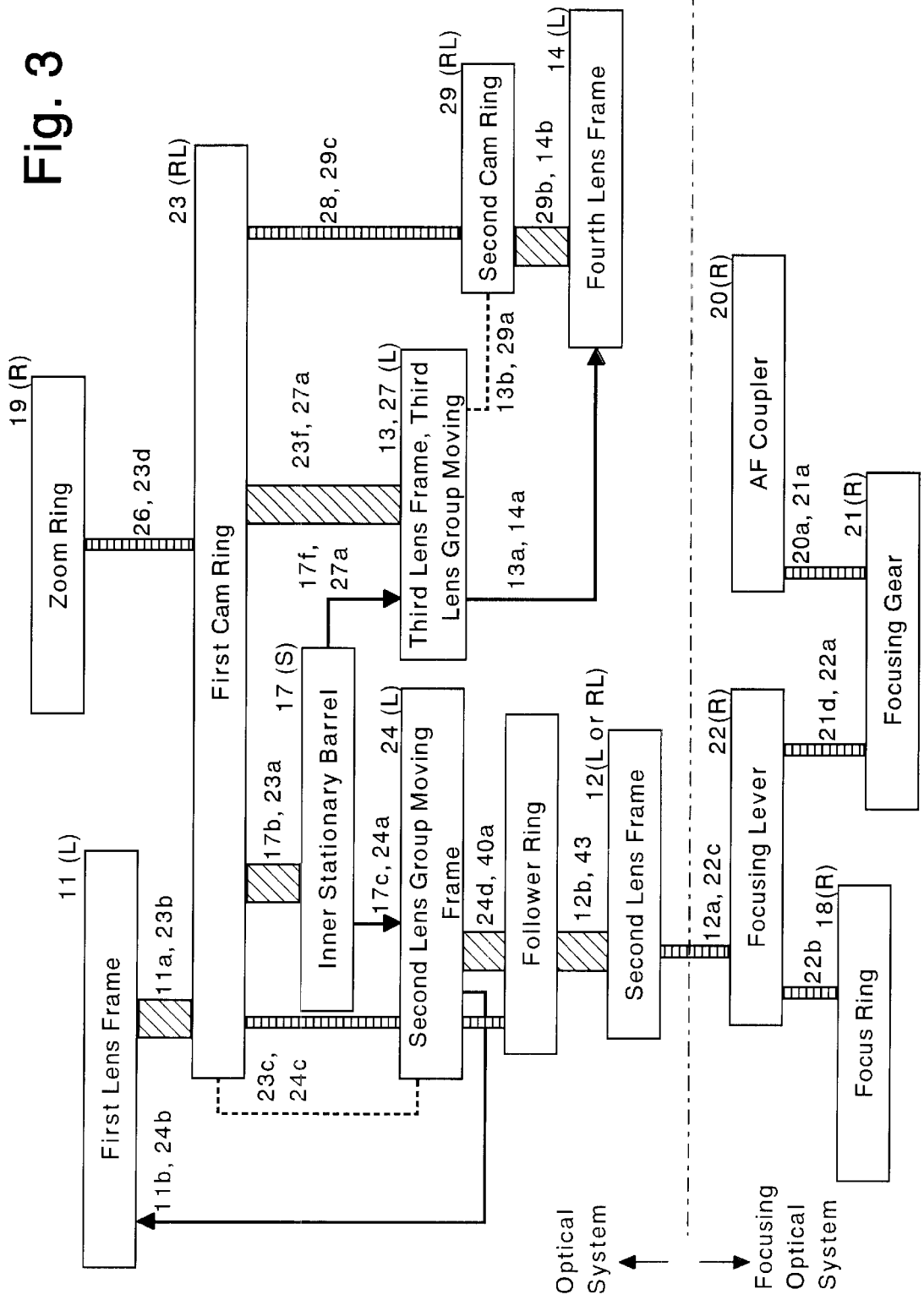
FIG. 3 is a conceptual diagram of interrelationships among fundamental elements of the varifocal lens barrel shown in FIGS. 1 and 2, showing extending guide mechanisms, rotation transfer mechanisms, and other mechanisms for the fundamental elements of the varifocal lens barrel.

FIG. 3 shows a block diagram of fundamental elements of the varifocal lens barrel 1 for the purpose of making the mechanical power transfer paths in the varifocal lens barrel 1 easily understandable. In FIG. 3 the parenthesized capital S suffix on the reference numeral indicates that the member is a stationary member, the parenthesized capital L suffix on the reference numeral indicates that the member is a linearly movable member which linearly moves along the optical axis O without rotating about the optical axis O, the parenthesized capital R suffix on the reference numeral indicates that the member is a rotatable member which rotates about the optical axis O without moving along the optical axis O, and the parenthesized capital RL suffix on the reference numeral indicates that the member is a movable member which moves along the optical axis O while rotating about the optical axis O. In addition, in FIG. 3, the arrow which extends from one block to another indicates that the member (represented by a rectangular block) at the beginning of the arrow guides another member (represented by a rectangular block) at the end of the arrow along the optical axis O, while the broken line which extends between two blocks indicates that the two members (each represented by a rectangular block) are engaged with each other so as to be rotatable relative to each other about the optical axis O and immovable along the optical axis O relative to each other. In addition, in FIG. 3 the diagonally shaded strip which extends between two blocks indicates a lead or cam mechanism (an extending guide mechanism) via which a rotation of one of two members (each represented by a rectangular block) causes the other member to move along the optical axis O, and the horizontally-hatched strip which extends between two blocks indicates a rotational transfer mechanism via which a rotation of one of the two members (each represented by a rectangular block) causes the other member to rotate about the optical axis O. In the description of the present invention, the lead mechanism is defined as a mechanism which provides a movable member with a movement in the direction of the optical axis O (i.e., in the optical axis direction) by rotation of a rotating ring having a linear relationship between the amount of movement of the movable member and the angle of rotation of the rotating ring, and the cam mechanism is defined as a mechanism which provides a movable member with movement in the direction of the optical axis O (i.e., in the optical axis direction) by rotation of a rotating ring having a non-linear relationship between the amount of movement of the movable member and the angle of rotation of the rotating ring.

The varifocal lens barrel 1 is provided with an annular lens mount 15, an outer stationary barrel 16, and an inner stationary barrel 17 which are all stationary members of the varifocal lens barrel 1. The lens mount 15 is fixed at the rear end of the varifocal lens barrel 1, and is mounted to, and dismounted from, a corresponding annular body mount 71 of an SLR camera body 70. The outer stationary barrel 16 is fixed to the lens mount 15. As can be seen in FIGS. 1 and 2, a portion of the outer stationary barrel 16 is exposed to the outside of the varifocal lens barrel 1. The inner stationary barrel 17 is fixed to the outer stationary barrel 16. No portion of the inner stationary barrel 17 is exposed to the outside of the varifocal lens barrel 1. The varifocal lens barrel 1 is provided with a focusing ring (manual focus ring/focus operation ring) 18 and a zoom ring (zoom operation ring) 19, each of which is supported to be rotatable about the optical axis O and immovable in the optical axis direction. The focusing ring 18 is fitted in the outer stationary barrel 16 to be supported thereby so that a front end portion (a hand-operated portion) of the focusing ring 18 is positioned in the front of the outer stationary barrel 16. The zoom ring 19 is fitted on the outer stationary barrel 16 to be supported thereby so that a front end portion (a hand-operated portion) of the outer stationary barrel 16 is positioned in front of the zoom ring 19.

The varifocal lens barrel 1 is provided at the rear end thereof with an AF coupler (female coupler/driving gear) 20 which extends parallel to the optical axis O from a rear surface (engaging surface) of the lens mount 15 to the inside of the varifocal lens barrel 1. The AF coupler 20 extends through a hole an inner flange 16a formed at the rear end of the outer stationary barrel 16 so that a gear portion 20a formed at the front of the AF coupler 20 is positioned immediately in front of the inner flange 16a. When the lens mount 15 is mounted to the body mount 71, the AF coupler 20 is engaged with the front end of an AF coupler (male coupler) 72 which slightly projects from a front surface (engaging surface) of the body mount 71 of the camera body 70. Once the AF coupler 20 is correctly engaged with the AF coupler 72, a rotation of the AF coupler 72 causes the AF coupler 20 to rotate together with the AF coupler 72.

Figure 4:
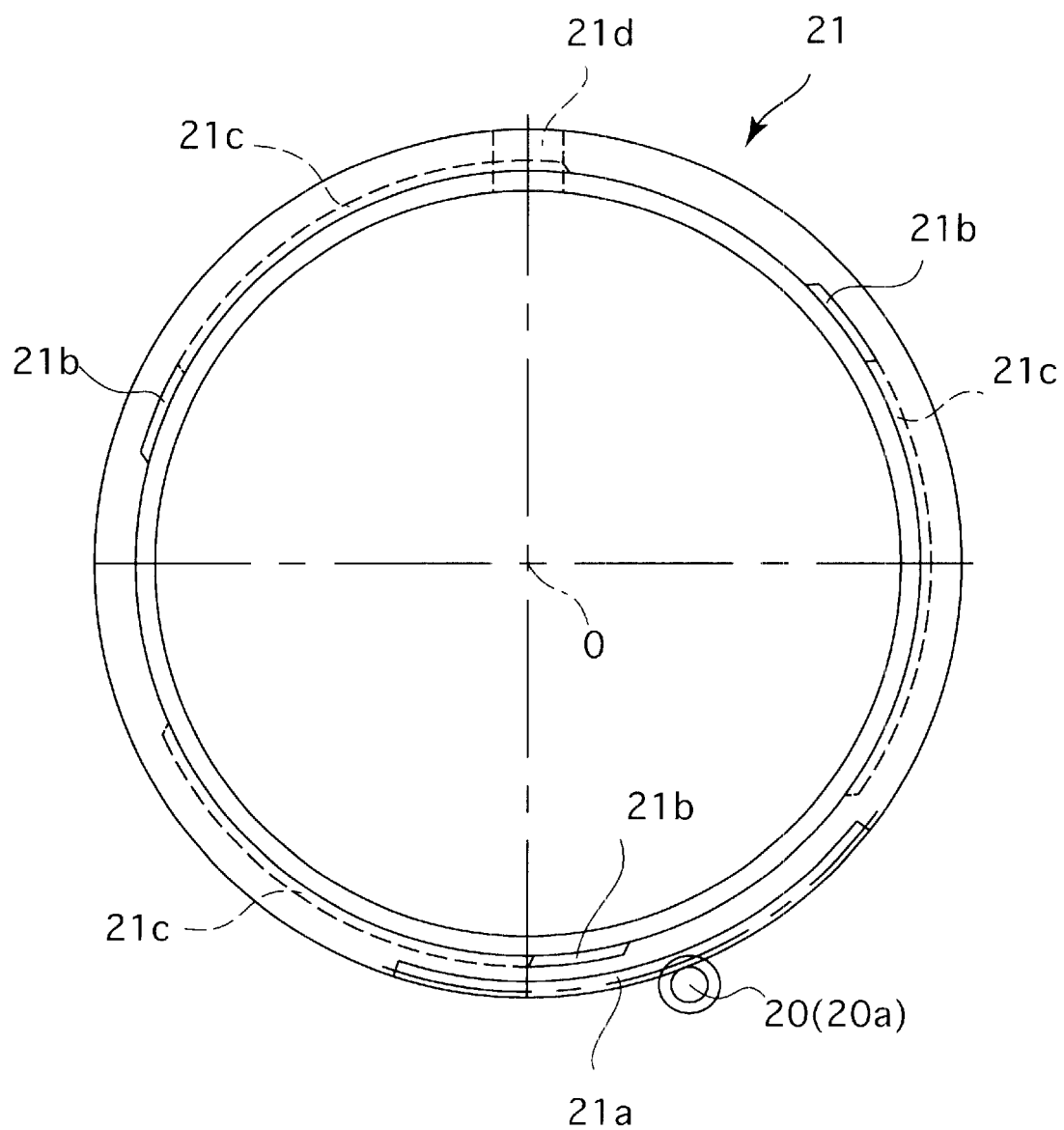
FIG. 4 is a rear elevational view of a focusing gear provided as an element of the varifocal lens barrel shown in FIGS. 1 and 2.
Figure 5:
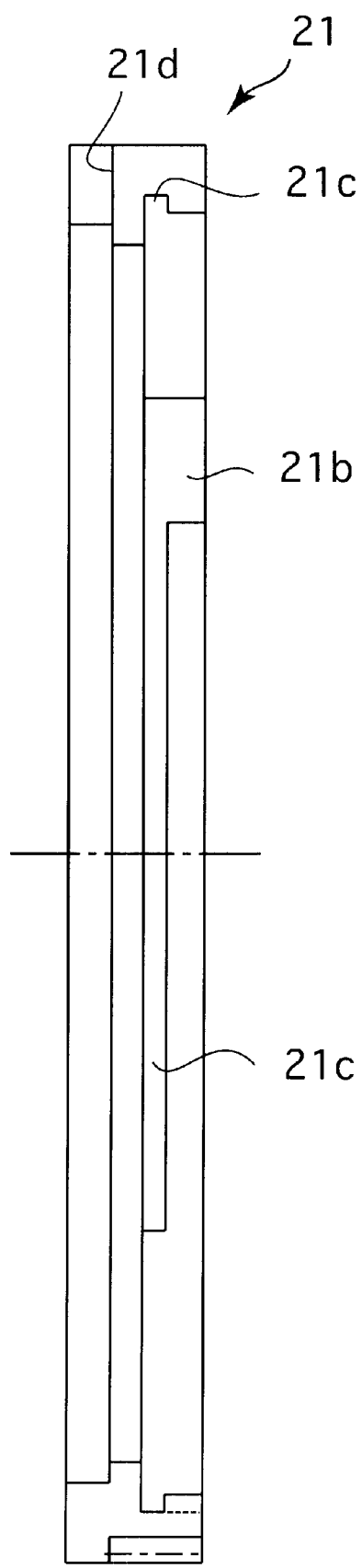
FIG. 5 is a side elevational view of the focusing gear shown in FIG. 4.

The varifocal lens barrel 1 is provided therein, immediately in front of the inner flange 16a, with a focusing gear (annular gear) 21. The focusing gear 21 is provided on an outer peripheral surface thereof with a sector gear portion 21a which meshes with the gear portion 20a of the AF coupler 20. The focusing gear 21 is supported by the inner flange 16a to be rotatable about the optical axis O in forward and reverse directions by a predetermined angle of rotation. As shown in FIGS. 4 and 5, the focusing gear 21 is provided with three leading grooves 21b which extend parallel to the optical axis O, and three arc grooves 21c which circumferentially extend about the optical axis O. Three outer projections 16b formed on the outer stationary barrel 16 can be inserted into the three arc grooves 21c via the three leading grooves 21b, respectively. Each of the three arc grooves 21c makes it possible for the corresponding outer projection 16b to be slidable along the arc groove 21c within a predetermined range. Accordingly, the outer projections 16b and the three arc grooves 21c define the range of rotation of the focusing gear 21 about the optical axis O relative to the outer stationary barrels 16. Forward and reverse rotations of the gear portion 20a of the AF coupler 20 cause the focusing gear 21 to rotate about the optical axis O in forward and reverse directions, respectively, without moving in the optical axis direction relative to the outer stationary barrels 16. Namely, rotation of the AF coupler 20 is transferred to the focusing gear 21 via the gear portion 20a and the sector gear portion 21a. During normal operation of the varifocal lens barrel 1, the relative position of each of the three outer projections 16b is never moved to one end (upper end as viewed in FIG. 5) of the associated arc groove 21c, which is connected to the associated leading groove 21b, so that each outer projection 16b never comes out of the associated arc groove 21c.

Figure 6:
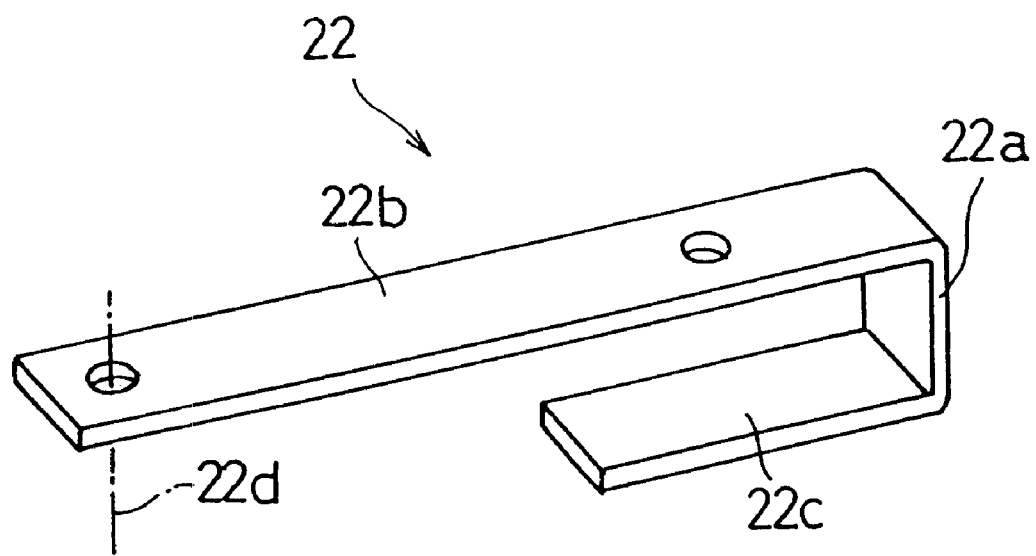
FIG. 6 is a perspective view of a focusing lever provided as an element of the varifocal lens barrel shown in FIGS. 1 and 2.

The focusing gear 21 is provided at a predetermined circumferential position with a radial insertion groove 21d in which a radial portion 22a (see FIG. 6) of a focusing lever 22 is engaged. The focusing lever 22 is provided with the radial portion 22a, an outer long arm 22b which extends forward in a direction parallel to the optical axis O from an outer end (upper end as viewed in FIG. 6) of the focusing lever 22, and an inner short arm 22c which extends forward in a direction parallel to the optical axis O from an inner end (lower end as viewed in FIG. 6) of the focusing lever 22. The outer long arm 22b is fixed to the inner peripheral surface of the focusing ring 18 by a set screw 22d. The inner short arm 22c is engaged with a rotational transfer arm 12a so as to be movable in the optical axis direction relative to the rotational transfer arm 12a, which is fixed to the second lens frame 12. Rotation of the focusing lever 22 is transferred to the second lens frame 12 via the inner short arm 22c and the rotational transfer arm 12a. The rotational transfer arm 12a is an elongated member extending substantially parallel to the optical axis O, and is provided at the rear end thereof with a bifurcated portion which holds the inner short arm 22c so that the inner short arm 22c is movable relative to the rotational transfer arm 12a. With this structure, the focusing ring 18 and the focusing gear 21 rotate together about the optical axis O when the focusing ring 18 is manually turned or when the focusing gear 21 is driven to rotate. Therefore, the focusing gear 21 rotates together with the focusing ring 18 when the focusing gear 21 is rotated by rotation of the AF coupler 20. On the other hand, the focusing ring 18 rotates together with the focusing gear 21 when the focusing ring 18 is manually turned. In either case, the second lens frame 12 that supports the second lens group L2 is rotated about the optical axis O via the inner short arm 22c and the rotational transfer arm 12a. The radial insertion groove 21d of the focusing gear 21 and the radial portion 22a of the focusing lever 22 only need to function to prevent the focusing gear 21 and the focusing lever 22 from rotating about the optical axis O relative to each other, so that the radial portion 22a can be fixed to the radial insertion groove 21d by an adhesive or can simply be fitted in the radial insertion groove 21d.

Figure 7:
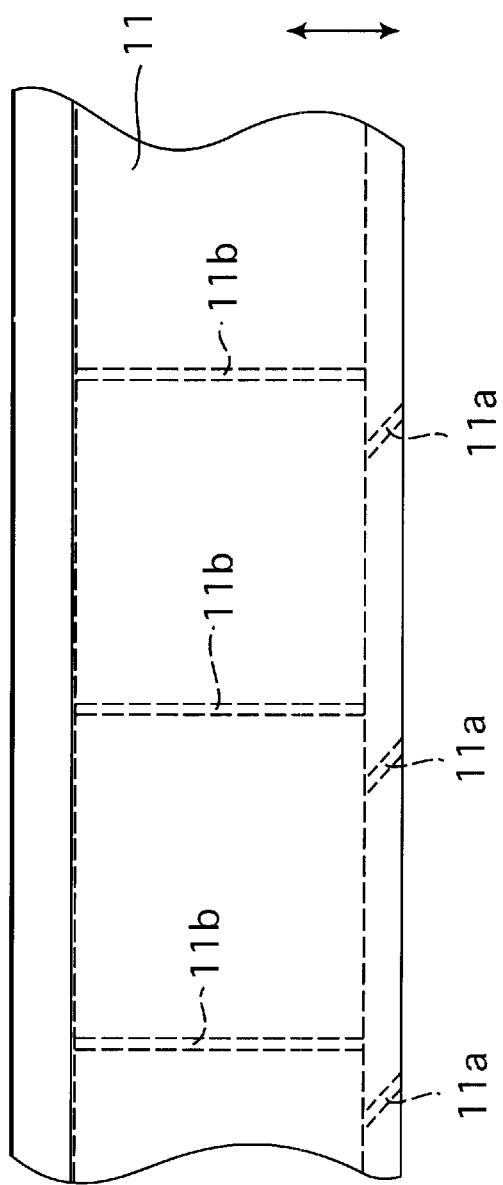
FIG. 7 is a developed view of an outer peripheral surface of a first lens frame provided as an element of the varifocal lens barrel shown in FIGS. 1 and 2.
Figure 9:
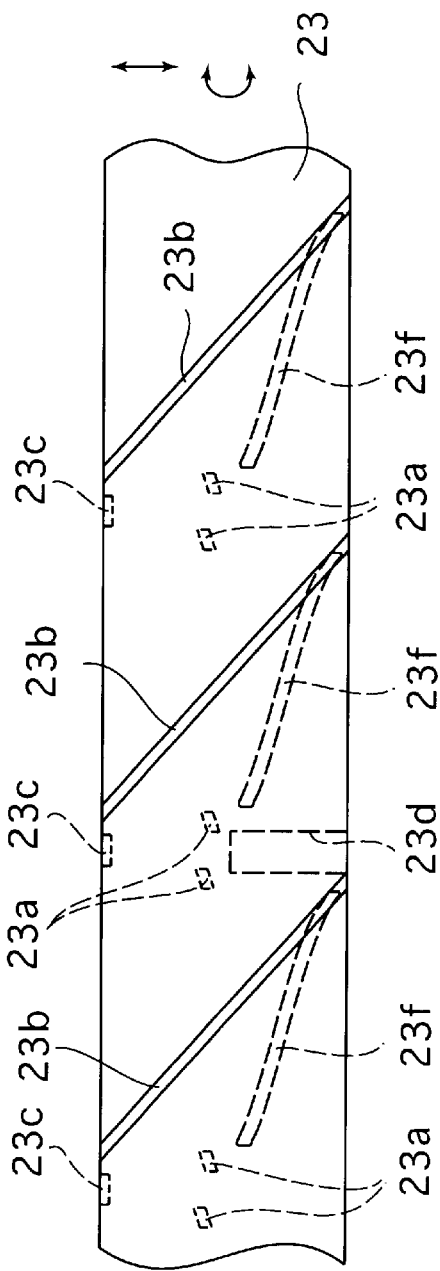
FIG. 9 is a developed view of an outer peripheral surface of a first cam ring provided as an element of the varifocal lens barrel shown in FIGS. 1 and 2.
Figure 10:
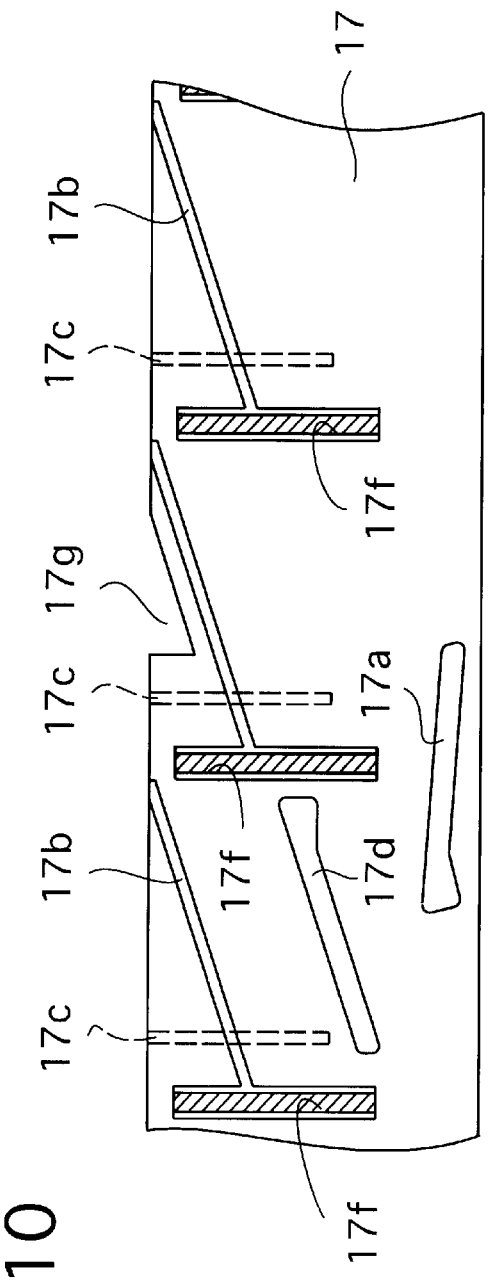
FIG. 10 is a developed view of an outer peripheral surface of an inner stationary barrel provided as an element of the varifocal lens barrel shown in FIGS. 1 and 2.

As shown in FIG. 10, the inner stationary barrel 17 is provided with a circumferential through slot 17a in which the focusing lever 22 is inserted to be rotatable about the optical axis O relative to the inner stationary barrel 17 within a predetermined range defined by the circumferential length of the circumferential through slot 17a. The inner stationary barrel 17 is provided on outer peripheral surface thereof with a set of three rib-like lead protrusions 17b which extend obliquely to both the optical axis direction and the circumferential direction of the inner stationary barrel 17. The varifocal lens barrel 1 is provided between the first lens frame 11 and the second lens frame with a first cam ring (zoom drive ring) 23. Each of the three lead protrusions 17b is engaged with a corresponding pair of follower projections 23a formed on an inner surface of the first cam ring 23 so that each pair of follower projections 23a are in sliding contact with opposite (both) sides of the corresponding lead protrusion 17b, respectively. As shown in FIG. 9, the first cam ring 23 is provided on an outer peripheral surface thereof with a set of three rib-like lead protrusions (extending guide portions) 23b which extend obliquely to both the optical axis direction and the circumferential direction of the first cam ring 23 in a direction opposite to the direction in which the set of three rib-like lead protrusions 17b are inclined. The three lead protrusions 23b are slidably engaged in three lead grooves (extending guide portion) 11a (see FIG. 7) formed on an inner surface of the first lens frame 11, respectively. The inner stationary barrel 17 is provided on an inner peripheral surface thereof with a set of three linear guide grooves (linear guide portions) 17c which extend parallel to the optical axis O. The varifocal lens barrel 1 is provided between the first cam ring 23 and the second lens frame 12 with a second lens group moving frame (intermediate movable frame) 24. The second lens group moving frame 24 is an annular member, and is provided on an outer peripheral surface thereof with a set of three linear guide elongated projections 24a (see FIG. 8) which extend parallel to the optical axis O to be slidably engaged in the set of three linear guide grooves 17c of the inner stationary barrel 17, respectively. The first lens frame 11 is provided on an inner surface thereof with a set of three linear guide grooves 11b which extend parallel to the optical axis O. The second lens group moving frame 24 is provided on an outer peripheral surface thereof with another set of three linear guide elongated projections (linear guide portions) 24b which extend parallel to the optical axis O to be slidably engaged in the set of three linear guide grooves 11b of the first lens frame 11, respectively.

Due to the engagement of the linear guide grooves 17c with the linear guide elongated projections 24a, and the engagement of the linear guide grooves 11b with the linear guide elongated projections 24b, the second lens group moving frame 24 and the first lens frame 11 are allowed to move in the optical axis direction relative to the inner stationary barrel 17, and are prevented from rotating about the optical axis O relative to the inner stationary barrel 17. Accordingly, each of the first lens frame 11 and the second lens group moving frame 24 is linearly movable in the optical axis direction and not rotatable about the optical axis O.

As shown in FIG. 9, the first cam ring 23 is provided, on an inner peripheral surface thereof at the front end of the first cam ring 23, with a set of three guide projections (engaging portion) 23c which extend radially inwards. The second lens group moving frame 24 is provided on an inner peripheral surface thereof with a circumferential groove (guiding portion) 24c, in which the three guide projections 23c of the first cam ring 23 are engaged, to be slidable in the circumferential groove 24c therealong and to be immovable in the optical axis direction relative to the second lens group moving frame 24. Accordingly, the first cam ring 23 is movable in the optical axis direction together with the second lens group moving frame 24, and is rotatable about the optical axis O relative to the second lens group moving frame 24. Although, during assembly, the three guide projections 23c of the first cam ring 23 are inserted into the circumferential groove 24c via three insertion grooves 24e (see FIG. 8) formed adjoining to the circumferential groove 24c, respectively, during normal operation of the varifocal lens barrel 1, the three guide projections 23c never move to positions (engaging/disengaging positions) on the circumferential groove 24c adjoining to the three insertion grooves 24e, respectively. Therefore, each guide projection 23c never comes out of the circumferential groove 24c during operation of the varifocal lens barrel 1.

Figure 15:
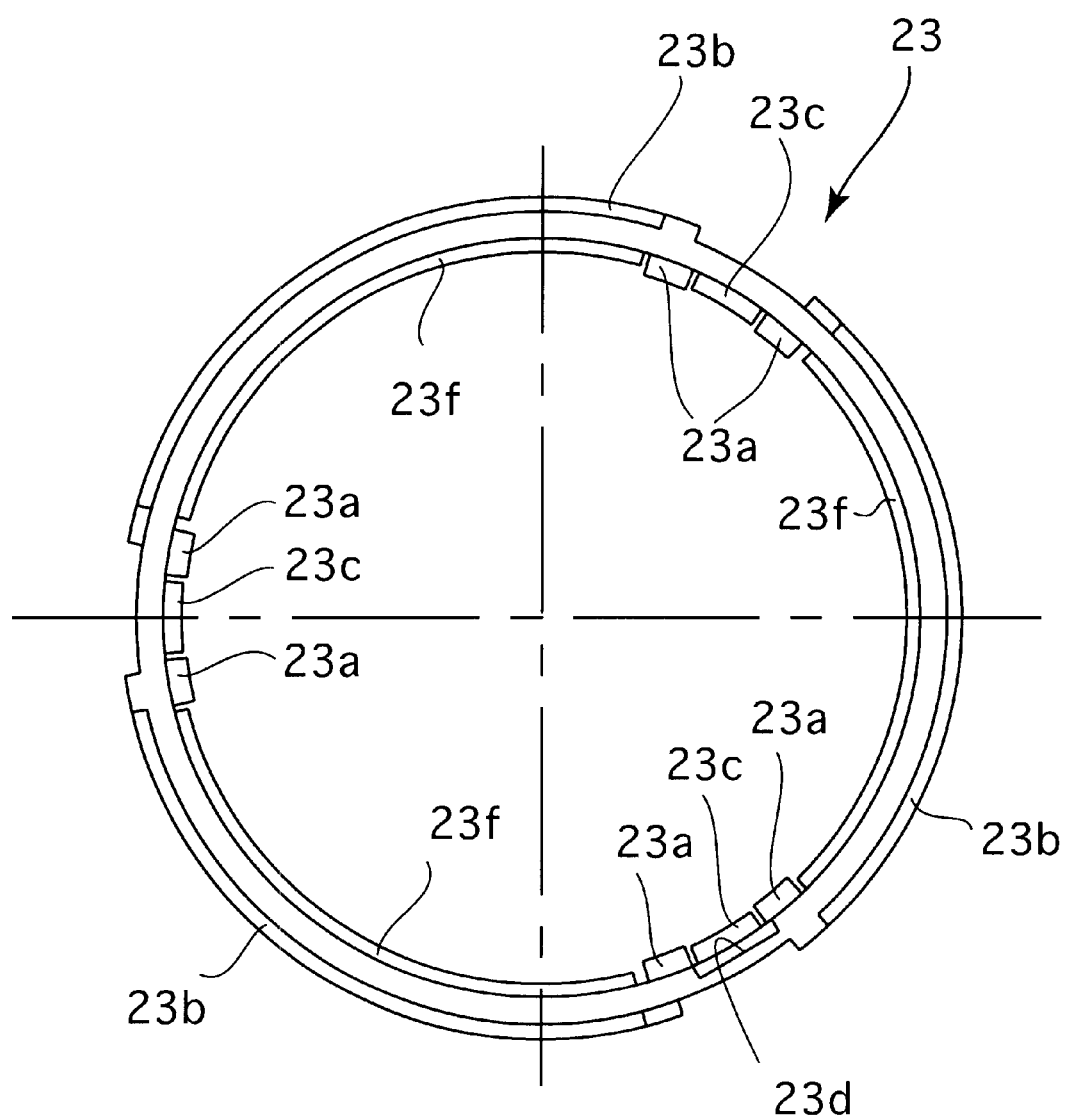
FIG. 15 is a rear elevational view of the first cam ring shown in FIG. 9.

The first cam ring 23 is provided on an inner peripheral surface thereof with a rotational transfer recess 23d which extends parallel to the optical axis O. A zoom lever (see FIGS. 1 and 2) 26 which is fixed to an inner peripheral surface of the zoom ring 19 is engaged in the rotational transfer recess 23d to be movable in the optical axis direction relative to the first cam ring 23 and not to be rotatable about the optical axis O relative to the first cam ring 23, so that rotation of the zoom ring 19 is transferred to the first cam ring 23 via the zoom lever 26. The shape of the zoom lever 26 is similar to that of the focusing lever 22. If the first cam ring 23 is rotated, the first cam ring 23 moves in the optical axis direction due to the engagement of the three pairs of follower projections 23a with the three lead protrusions 17b. Although the zoom ring 19 rotates at a predetermined axial position, i.e., without moving in the optical axis direction, the first cam ring 23 that rotates together with the zoom ring 19 rotates while moving in the optical axis direction. The second lens group moving frame 24 moves together with the first cam ring 23 in the optical axis direction but does not rotate about the optical axis O due to the engagement of the circumferential groove 24c with the three guide projections 23c. FIG. 15 is a rear view of the first cam ring 23, as viewed from the rear thereof along the optical axis O.

If the first cam ring 23 rotates via rotation of the zoom ring 19, the first lens frame 11 which supports the first lens group L1 moves linearly in the optical axis direction without rotating about the optical axis O due to the engagement of the three lead protrusions 23b with the three lead grooves 11a and the engagement of the three linear guide grooves 11b with the three linear guide elongated projections 24b.

The second lens frame 12 is supported by the second lens group moving frame 24 via a follower ring (guide ring) 40. As can be seen in FIGS. 1 and 2, the second lens frame 12 that supports the second lens group L2 moves in the optical axis direction by the same amount of movement as the amount of movement of the second lens group moving frame 24, via the follower ring 40, when the second lens group moving frame 24 moves together with the first cam ring 23 in the optical axis direction without rotating about the optical axis O via rotation of the zoom ring 19. At this time, the second lens frame 12 does not rotate relative to the second lens group moving frame 24.

The movement of the zooming operation with respect to the first and second lens groups L1 and L2 is understood from the above descriptions. The movement of the zooming operation with respect to the third and fourth lens groups L3 and L4 will be hereinafter discussed.

The varifocal lens barrel 1 is provided therein with a second cam ring drive lever 28 which is fixed to the rear end of the first cam ring 23. A middle portion of the second cam ring drive lever 28 extends parallel to the optical axis O, and a rear end portion of the second cam ring drive lever 28 extends radially outwards from the rear end of the middle portion of the second cam ring drive lever 28, in a direction perpendicular to the optical axis O, to pass through an elongated through hole 17d (see FIG. 10) formed on the inner stationary barrel 17. The inner stationary barrel 17 is provided with a set of three through slots (linear guide portions) 17f which extend parallel to the optical axis O. The set of three through slots 17f serves as a guiding device for indirectly guiding the third lens frame 13 in the optical axis direction.

Figure 11:
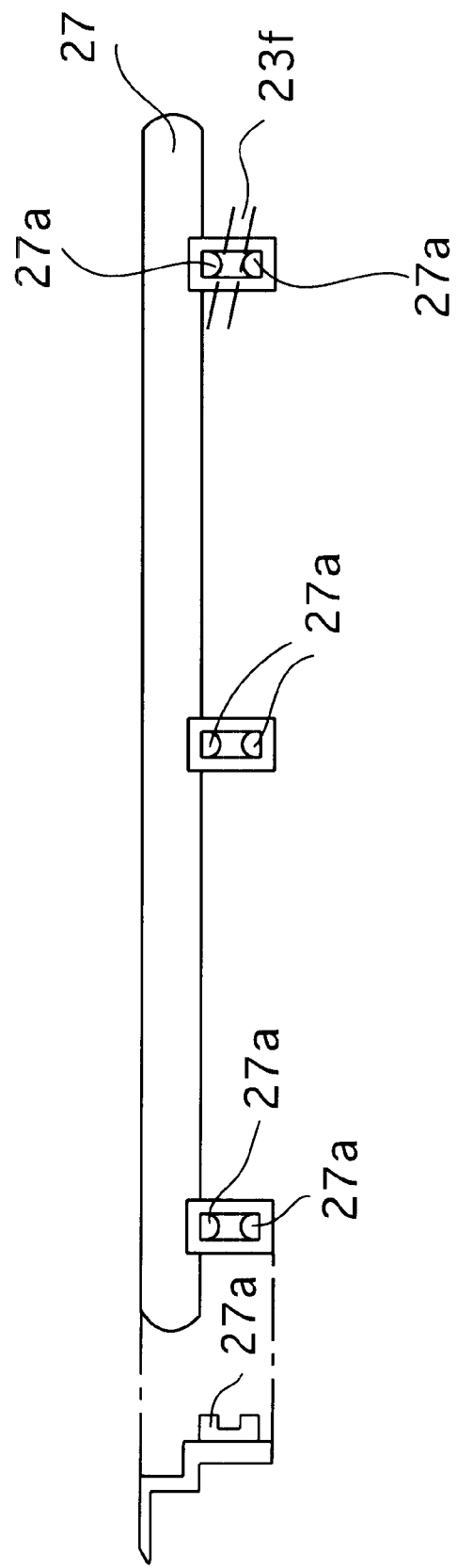
FIG. 11 is a developed view of an outer peripheral surface of a third lens group moving frame provided as an element of the varifocal lens barrel shown in FIGS. 1 and 2.

The varifocal lens barrel 1 is provided between the inner stationary barrel 17 and the third lens frame 13 with a third lens group moving frame 27. The third lens group moving frame 27 is an annular member, and is provided with a set of three pairs of follower pins (extending guide portions) 27a (see FIGS. 1 and 11) which are engaged in the set of three through slots 17f, respectively. The set of three pairs of follower pins 27a and the corresponding set of three through slots 17f serves as a linear guide device. The third lens group moving frame 27 is fitted in the inner stationary barrel 17 to be movable in the optical axis O direction relative to the inner stationary barrel 17 by the engagement of the three pairs of follower pins 27a and the three through slots 17f. The third lens group moving frame 27 is prevented from rotating about the optical axis relative to the inner stationary barrel 17. The first cam ring 23 is provided on an inner peripheral surface thereof with set of three rib-like cam protrusions (extending guide portion) 23f each of which is slidably held between the corresponding pair of follower pins 27a. With this structure, a rotation of the first cam ring 23 causes the third lens group moving frame 27 to move in the optical axis direction without rotating about the optical axis O due to the engagement of the three cam protrusions 23f with the three pairs of follower pins 27a in accordance with the contour of each cam protrusion 23f.

Figure 12:
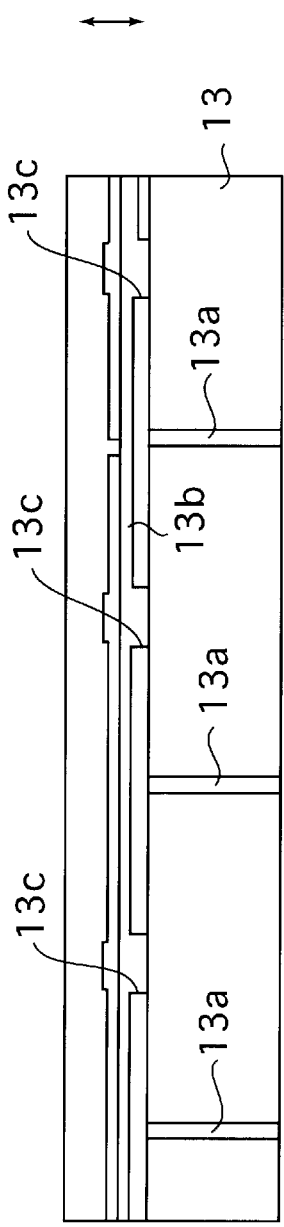
FIG. 12 is a developed view of an outer peripheral surface of a third lens frame provided as an element of the varifocal lens barrel shown in FIGS. 1 and 2.
Figure 13:
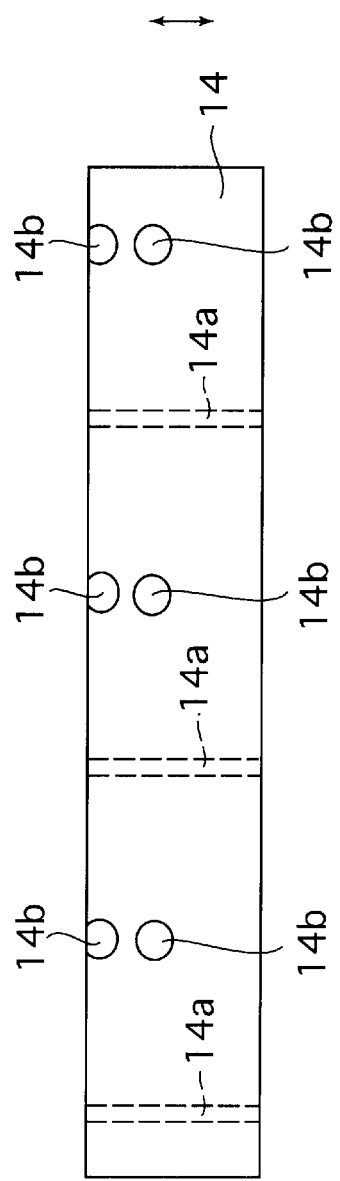
FIG. 13 is a developed view of an outer peripheral surface of a fourth lens frame provided as an element of the varifocal lens shown in FIGS. 1 and 2.
Figure 16:
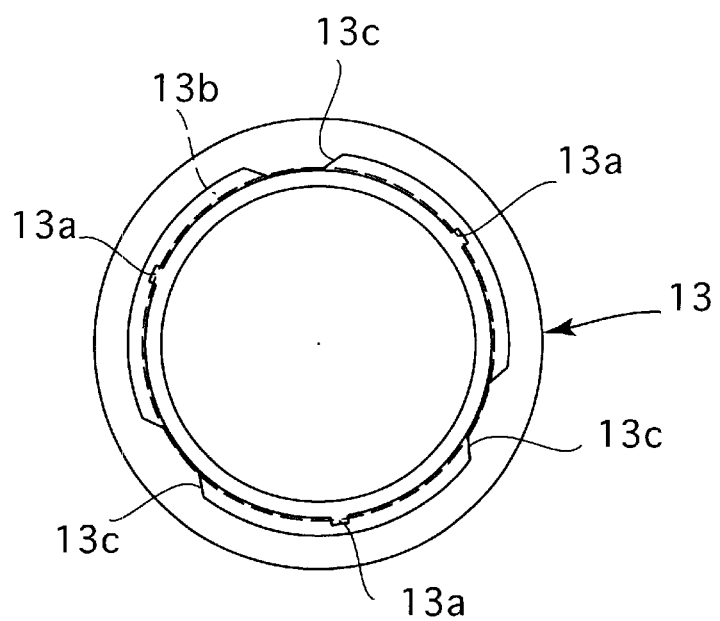
FIG. 16 is a rear elevational view of the third lens frame shown in FIG. 12.
Figure 17:
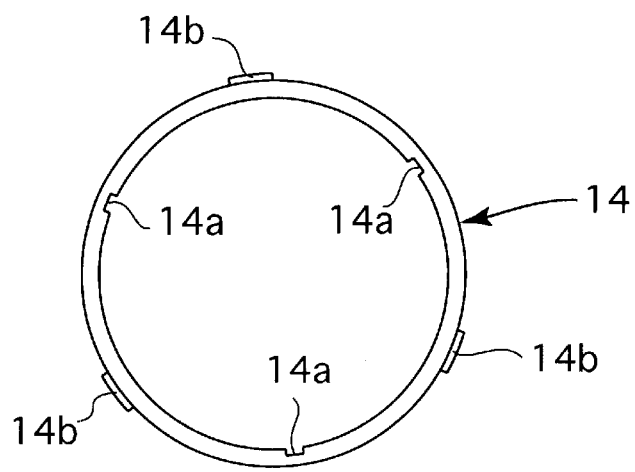
FIG. 17 is a rear elevational view of the fourth lens frame shown in FIG. 13.
Figure 18:
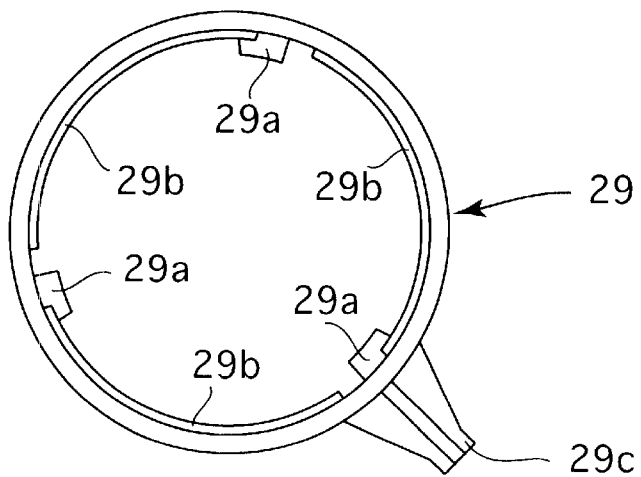
FIG. 18 is a rear elevational view of the second cam ring shown in FIG. 14.

The third lens frame 13 that supports the third lens group L3 is fixed to the third lens group moving frame 27 with a plurality of sector blades of an iris diaphragm (not shown) and a diaphragm drive ring 30 being held between the third lens frame 13 and an annular supporting portion 27b of the third lens group moving frame 27. The third lens frame 13 moves together with the third lens group moving frame 27 in the optical axis direction. As shown in FIGS. 12 and 16, the third lens frame 13 is provided on an outer peripheral surface thereof with a set of three linear guide elongated projections (linear guide projections) 13a which extend parallel to the optical axis O. The third lens frame 13 is further provided on an outer peripheral surface thereof with a circumferential groove (circumferential bottomed groove) 13b. The fourth lens frame 14 that supports the fourth lens group L4 is provided on an inner peripheral surface thereof with a set of three linear guide grooves (linear guide bottomed grooves) 14a (see FIGS. 13 and 17) in which the set of three linear guide elongated projections 13a of the third lens frame 13 are slidably engaged, respectively. With this structure, the fourth lens frame 14 is guided in the optical axis direction without rotating about the optical axis O relative to the third lens frame 13 due to the engagement of the three linear guide elongated projections 13a with the with three linear guide grooves 14a.

Figure 14:
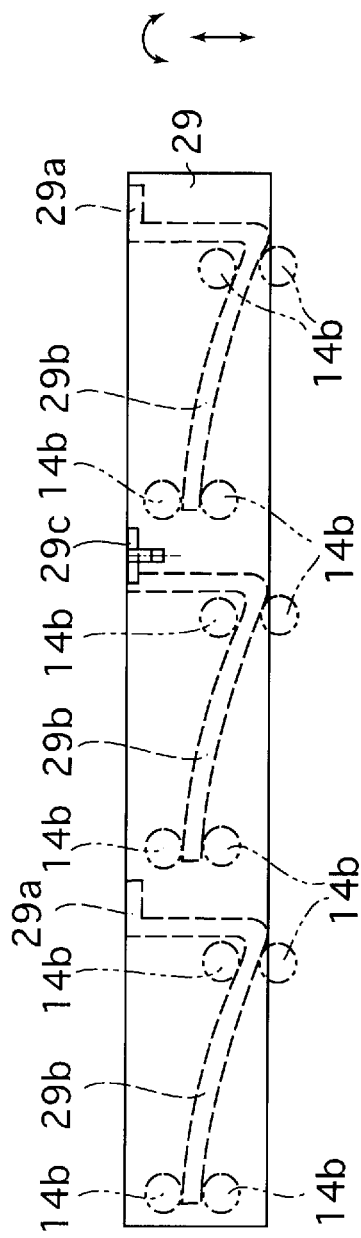
FIG. 14 is a developed view of an outer peripheral surface of a second cam ring provided as an element of the varifocal lens barrel shown in FIGS. 1 and 2.

The varifocal lens barrel 1 is provided on the third lens frame 13 with a second cam ring (rotating ring) 29 so that the second cam ring 29 can freely rotate about the optical axis O relative to the third lens frame 13. Specifically, as shown in FIG. 14, the second cam ring 29 is provided, on an inner peripheral surface at the front end thereof, with a set of three guide projections 29a which are slidably engaged in the circumferential groove 13b of the third lens frame 13. Therefore, the second cam ring 29 is rotatable about the optical axis O relative to the third lens frame 13, and moves together with the third lens frame 13 in the optical axis direction. The second cam ring 29 is provided on an inner peripheral surface thereof with a set of three rib-like cam protrusions (extending guide protrusions) 29b, each of which is slidably held between a corresponding pair of follower pins 14b formed on an outer peripheral surface of the fourth lens frame 14. With this structure, a rotation of the second cam ring 29 causes the fourth lens frame 14 to move in the optical axis direction.

When the third lens frame 13, the fourth lens frame 14, and the second cam ring 29 are put together during assembly, firstly the fourth lens frame 14 is fitted in the second cam ring 29 by inserting each of the three cam protrusions 29b into the gap between the corresponding pair of follower pins 14b. Secondly, this assembly consisting of the fourth lens frame 14 and the second cam ring 29 is brought into engagement with the third lens frame by inserting the three guide projections 29a into the circumferential groove 13b via three insertion grooves 13c (see FIG. 12) which are communicatively connected with the circumferential groove 13b, and at the same time, by inserting the three linear guide elongated projections 13a into the three linear guide grooves 14a, respectively. After this insertion operation has been completed, the fourth lens frame 14 can be guided in the optical axis direction without rotating about the optical axis O by the third lens frame 13. If the second cam ring 29 is rotated by a predetermined amount of rotation so that the three guide projections 29a of the second cam ring 29 are respectively positioned away from the three insertion grooves 13c to be fitted in the circumferential groove 13b, each pair of follower pins 14b is engaged with an effective section of the corresponding cam protrusion 29b to be used for zooming. Although the third lens frame 13 and the second cam ring 29 rotate about the optical axis O relative to each other when zooming operation is carried out, the three guide projections 29a never move to positions (engaging/disengaging positions) on the circumferential groove 13b which adjoin the three insertion grooves 13c, respectively, during operation of the varifocal lens barrel 1. Therefore, each guide projection 29a never comes out of the circumferential groove 13b during operation of the varifocal lens barrel 1.

The second cam ring 29 is provided on an outer peripheral surface thereof with a rotational transfer arm 29c which extends radially outwards. The second cam ring drive lever 28, which is fixed to the rear end of the first cam ring 23, is engaged with the rotational transfer arm 29c to be rotatable together with the rotational transfer arm 29c about the optical axis O and to be movable in the optical axis direction relative to the rotational transfer arm 29c. Therefore, if rotation of the zoom ring 19 is transferred to the second cam ring 29 via the first cam ring 23 and the second cam lever 28 by rotating the zoom ring 19, the third lens group moving frame 27 moves together with the third lens frame 13 and the third lens group L3 in the optical axis direction due to the engagement of the three cam protrusions 23f with the three pairs of follower pins 27a, while the fourth lens frame 14 which supports the fourth lens group L4 moves in the optical axis direction due to the engagement of the three rib-like cam protrusions 29b with the three pairs of follower pins 14b, to thereby achieve the zoom path of each of the third and fourth lens groups L3 and L4.

The overall operation of the varifocal lens barrel 1 will be hereinafter discussed with reference mainly to FIGS. 1 through 3. The zoom ring 19 is manually turned when it is desired to perform zooming operation. Rotation of the zoom ring 19 causes the first cam ring 23 to rotate about the optical axis O. At this time, the first cam ring 23 moves in the optical axis direction while rotating about the optical axis O due to the engagement of the three lead protrusions 17b with the three pairs of follower projections 23a, i.e., due to a first extending guide mechanism (17b and 23a) positioned between the first cam ring 23 and the inner stationary barrel 17. According to the first effect of the zooming movement (a combination of rotational movement about the optical axis O and movement in the optical axis direction O) of the first cam ring 23, the second lens group moving frame 24 moves together with the first cam ring 23 in the optical axis direction. At this time, the second lens frame 12 moves together with the second lens group moving frame 24 in the optical axis direction without rotating about the optical axis O. Moreover, according to the second effect of the zooming movement of the first cam ring 23, the first lens frame 11 moves in the optical axis direction in a predetermined zoom path due to a third extending guide mechanism which includes the three lead protrusions 23b and the three lead grooves 11a and which is positioned outside of the first cam ring 23. Furthermore, according to the third effect of movement of the first cam ring 23, the third lens frame 13 moves in the optical axis direction in a predetermined zoom path due to a fourth extending guide mechanism which includes the three cam protrusions 23f and the three pairs of follower pins 27a. Furthermore, according to the fourth effect of zooming movement of the first cam ring 23, rotation of the first cam ring 23 is transferred to the second cam ring 29, which causes the fourth lens frame 14 to move in the optical axis direction relative to the third lens frame 13 in a predetermined moving pattern due to a fifth extending guide mechanism which includes the three cam protrusions 29b and the three pairs of follower pins 14b and which is positioned between the second cam ring 29 and the fourth lens frame 14. Due to the above described structures, rotating the zoom ring 19 causes each of the first through fourth lens groups L1 through L4 to move along the optical axis O in a predetermined moving pattern to thereby vary the focal length of the varifocal lens barrel 1. Accordingly, in FIG. 3, each element shown above a one-dot chain line is a fundamental element of a drive system for the zooming operation.

The above descriptions for the zooming operation have been made without consideration given to the relationship between the second lens frame 12 (the second lens group L2), the second lens group moving frame 24 and the follower ring 40. As mentioned above, since a varifocal lens requires slight focus adjustment upon zooming, unless focused on infinity, the second lens group L2 (the focusing lens group) needs to be driven to advance from the standby position thereof by different amounts of movement at different focal lengths, respectively, to compensate for such as light focus variation when focusing on a object at a fixed distance. At this time, when focusing on a object at a fixed distance, the varifocal lens needs to bring the object into focus by moving the focusing lens group forward from the standby position thereof by different amounts of movement at different focal lengths, respectively, by turning the distance ring by same amounts of rotation from the infinite position thereof.

A support/guide mechanism which achieves such a focusing operation will be hereinafter discussed. The follower ring 40 is positioned between the second lens group moving frame 24 and the second lens frame 12. A second zoom lever (rotation transfer member) 42 is engaged with an inner peripheral surface of the first cam ring 23 so as to extend radially inwards. The second zoom lever 42, and hence the follower ring 40, is movable in the optical axis direction relative to the first cam ring 23. The inner end of the second zoom lever 42 is fixed to the follower ring 40 via a set screw 42a. When the first cam ring 23 is rotated about the optical axis O while moving in the optical axis direction by rotation of the zoom ring 19, the follower ring 40 rotates by an amount of rotation equal to that of the first cam ring 23 via the second zoom lever 42. The inner stationary barrel 17 is provided at the front end thereof with a cutout portion 17g through which the second zoom lever 42 passes through to extend inwards.

Figure 8:
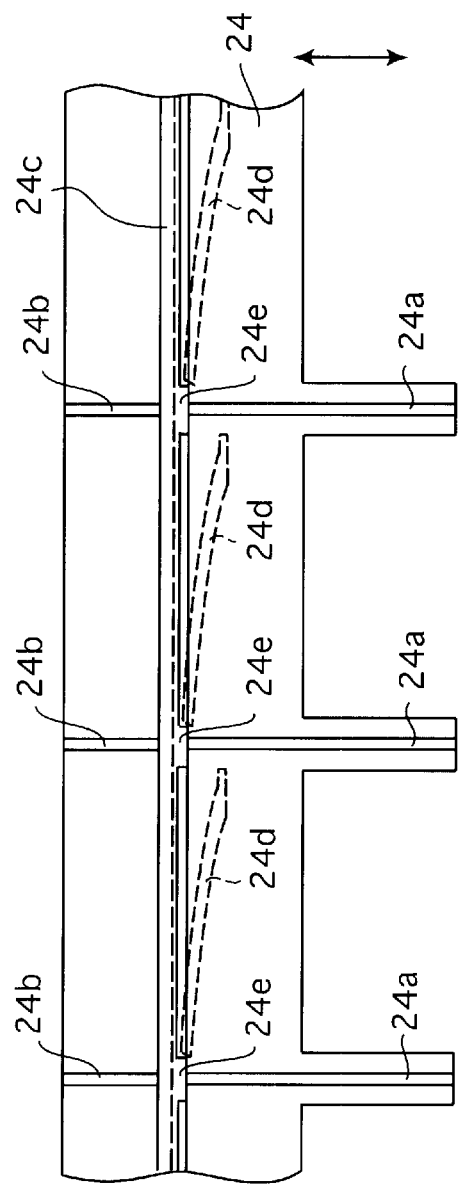
FIG. 8 is a developed view of an outer peripheral surface of a second lens group moving frame provided as an element of the varifocal lens shown in FIGS. 1 and 2.
Figure 19:
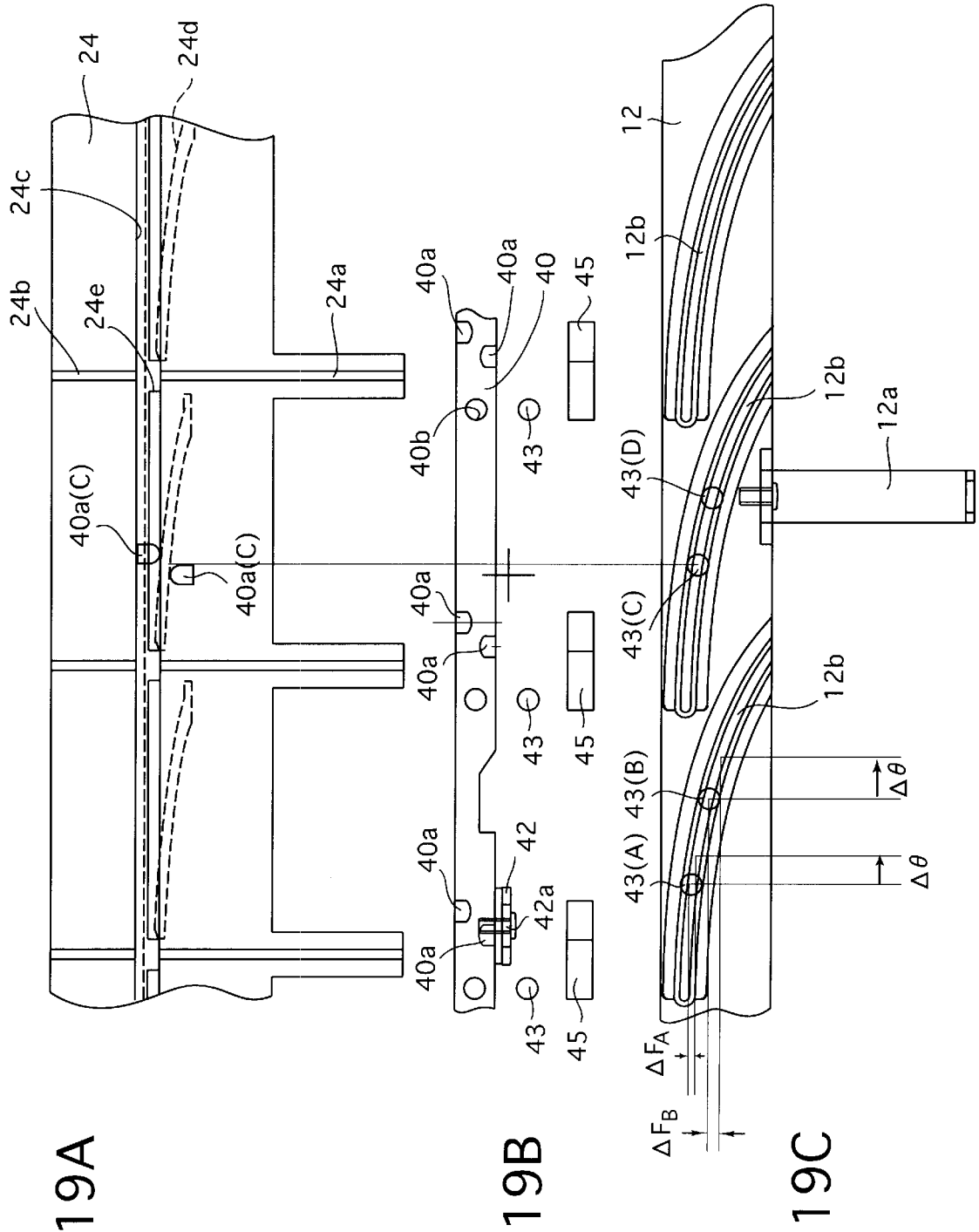
FIG. 19A is a developed view of an outer peripheral surface of a second lens group moving frame provided as an element of the varifocal lens barrel shown in FIGS. 1 and 2.
FIG. 19B is a developed view of an outer peripheral surface of a follower ring provided as an element of the varifocal lens barrel shown in FIGS. 1 and 2, showing the outer peripheral surface of the follower ring in connection with three spherical followers and three biasing members.
FIG. 19C is a developed view of an outer peripheral surface of a second lens frame provided as an element of the varifocal lens barrel shown in FIGS. 1 and 2.

As shown in FIGS. 8 and 19A, the second lens group moving frame 24 is provided, on an inner peripheral surface thereof at regular intervals in a circumferential direction of the second lens group moving frame 24, with a set of three cam protrusions (adjustment cam portions) 24d. As shown in FIG. 19B, the follower ring 40 is provided, on an outer peripheral surface thereof at regular interval in a circumferential direction of the follower ring 40, with a set of three pairs of follower projections 40a which are respectively engaged with the set of three cam protrusions 24d. More specifically, each pair of follower projections 40a holds the corresponding cam protrusion 24d therebetween. Note that each pair of follower projections 40a are formed at slightly different positions in a circumferential direction of the follower ring 40 as shown in FIG. 19B so that a mold for molding the follower ring 40 can be easily removed from the follower ring 40 when the follower ring 40 is molded.

The inner peripheral surface of the follower ring 40 holds three spherical followers (balls) 43 at regular intervals in a circumferential direction of the follower ring 40. These three spherical followers 43 are respectively engaged in three cam grooves (bottomed focusing cam grooves) 12b formed on an outer peripheral surface of the second lens frame 12. As shown in FIG. 19C, the three cam grooves 12b are formed on an outer peripheral surface of the second lens frame 12 at regular intervals in a circumferential direction of the second lens frame 12. Camming portions (operating portions) of all the cam grooves 12b and the cam protrusions 24d have the same contour. Strictly speaking, the length of each cam protrusion 24d is slightly shorter than the length of each cam groove 12b because each cam protrusion 24d is formed to extend solely over a range corresponding to the maximum angle of rotation of the first cam ring 23 between the telephoto extremity and the wide-angle extremity (i.e., an operating range of the first cam ring 23). However, a camming portion of each cam protrusion 24d and a camming portion of the corresponding portion of each cam groove 12b have the same contour.

The three spherical followers 43 are respectively fitted in three radial through holes (radial hole) 40b formed on the follower ring 40 with a minimum clearance. The follower ring 40 is provided thereinside with three biasing members 45 which bias the three spherical followers 43 radially inwards so that the three spherical followers 43 respectively come into pressing contact with the three cam grooves 12b.

Operations of the above described support/guide mechanism for the second lens group L2 for a zooming operation will be hereinafter discussed. As described above, if the first cam ring 23 moves in the optical axis direction while rotating about the optical axis O via rotation of the zoom ring 19 in a range between telephoto extremity and wide-angle extremity, the second lens group moving frame 24 moves together with the first cam ring 23 in the optical axis direction without rotating about the optical axis O by an amount of movement equal to that of the first cam ring 23. At this time, the follower ring 40 is rotated by the second zoom lever 42 through an angle of rotation equal to that of the first cam ring 23, whereby the follower ring 40 moves in the optical axis direction relative to the second lens group moving frame 24 due to engagement of the three pairs of follower projections 40a with the three cam protrusions 24d.

On the other hand, the second lens frame 12 is supported by the follower ring 40 via the engagement of the three spherical followers 43 with the three cam grooves 12b. A rotation of the follower ring 40 via rotation of the first cam ring 23 causes the second lens frame 12 and the follower ring 40 to move in the optical axis direction relative to each other in accordance with the engagement of the three spherical followers 43 with the three cam grooves 12b (the second lens frame 12 does not rotate unless the focusing ring 18 is manually turned 18). At this time, the amount of movement of the second lens frame 12 and the direction of movement thereof relative to the follower ring 40 are identical to those of the second lens group moving frame 24 relative to the follower ring 40 since the camming portions of all the cam grooves 12b and the cam protrusions 24d have the same contour, as mentioned above. Namely, when zooming operation is carried out, the second lens frame 12 and the second lens group moving frame 24 move together in the optical axis direction by the same amount of rotation since the follower ring 40 varies the rotational positions and the axial positions of the second lens frame 12 and the second lens group moving frame 24 equally as can be seen in FIGS. 1 and 2. Since the second lens group moving frame 24 is an element which moves together with the first cam ring 23 in the optical axis direction by the same amount of movement as mentioned above, the amount of movement of the second lens frame 12 (i.e., the amount of movement of the second lens group L2) is determined solely by the contour of the camming portion of each lead protrusion 17b of the inner stationary barrel 17, without being affected by either the cam grooves 12b or the cam protrusions 24d.

For instance, if the second lens group moving frame 24 advances by an amount of movement $\Delta Z_L$ when the varifocal lens barrel is extended to vary focal length from wide-angle extremity to telephoto extremity (from a state shown in FIG. 2 to a state shown in FIG. 1), the second lens frame 12 advances by the same amount of movement $\Delta Z_L$, and at the same time, the follower ring 40 advances by an amount of movement equal to the amount of movement $\Delta Z_L$ from which an amount of movement $\Delta F_O$ is subtracted, i.e., by an amount of movement "$\Delta Z_L - \Delta F_O$". $\Delta F_O$ represents the amount of movement of the follower ring 40 relative to the second lens frame 12 and the second lens group moving frame 24 due to the engagement of the three pairs of follower projections 40a with the set of three cam protrusions 24d.

Operations of the second lens frame 12, the second lens group moving frame 24 and the follower ring 40 when zooming operation is performed have been described above. Operations of the second lens frame 12, the second lens group moving frame 24 and the follower ring 40 when focusing operation is performed will be hereinafter discussed in detail. A focusing operation is performed by rotating the second lens frame 12 via either a manual operation of the focusing ring 19 or driving of the AF coupler 20. A rotation of the focus ring 18 is transferred to the second lens frame 12 via the focusing lever 22 (which is an element shown below the one-dot chain line shown in FIG. 3), while a rotation of the AF coupler 20 is transferred to the second lens frame 12 via the focusing gear 21 and the focusing lever 22 (which are elements shown below the one-dot chain line shown in FIG. 3). If the second lens frame 12 rotates about the optical axis O, the second lens frame 12 moves in the optical axis direction relative to the follower ring 40 due to the engagement of the three spherical followers 43 with the three cam grooves 12b, which causes the second lens group L2 to move the optical axis direction relative to the other lens groups L1, L3 and L4 which are stationary at this time to vary the position of a focal point to bring the object into focus. In a state where the zoom ring 19 is not manually operated, the follower ring 40 and the second lens group moving frame 24 can be regarded as a substantially integral member, since the cam follower 40 neither rotates about the optical axis O nor moves in the optical axis direction. Therefore, the amount of movement of the second lens frame 12 that supports the second lens group L2 when focusing operation is performed is determined solely by the contour of the camming portion of each cam groove 12b.

The relative rotational position of the second lens frame 12 and the follower ring 40 about the optical axis O and also the relative position in the optical axis direction between the second lens frame 12 and the follower ring 40 vary if zooming operation is carried out as described above. This means that the position of each spherical follower 43 relative to the corresponding cam groove 12b changes during a zooming operation. As a result, a variation of the focal length causes the operating range of each cam groove 12b which is used for focusing operation to vary. Therefore, if the operating range of each cam groove 12b varies, the amount of movement of the second lens frame 12 in the optical axis direction per unit of rotation thereof also varies accordingly since the camming portion of each cam groove 12b has a non-linear contour. For instance, as shown in FIG. 19C, when each spherical follower 43 is positioned at a point (A) in the associated cam groove 12b when focal length is A', each spherical follower 43 moves from point (A) to point (B) in the associated cam groove 12b if the zoom ring 19 is turned to vary focal length from A' to B' without focusing operation being performed. If the second lens frame 12 is rotated by the same angle of rotation $\Delta\theta$ in each of the two cases where focal length is A' and B', each spherical follower 43 moves relative to the associated cam groove 12b by an amount of movement $\Delta F_A$ when focal length is A' while each spherical follower 43 moves relative to the associated cam groove 12b by another amount of movement $\Delta F_B$ when focal length is B'. Consequently, the amount of movement of the second lens group L2 per unit of rotation of the second lens frame 12 is not the same at different focal lengths A' and B'. It can be appreciated by those skilled in the art from this structure that if the contour of the camming portion of each of the cam grooves 12b and the cam protrusions 24d is determined appropriately, the second lens frame 12 can be driven to advance from the standby position thereof by different amounts of movements at different focal lengths via same angle of rotations of the focus ring 18, to compensate for a slight focus variation caused by zooming operation and to focus on the object.

The above descriptions about the zooming operation and focusing operation have been made on the assumption that focusing operation is performed after zooming operation has been performed in a state where each spherical follower 43 and each pair of follower projections 40a are respectively engaged with the associated cam groove 12b and the associated cam protrusion 24d at positions corresponding to each other. Since the respective positions of each spherical follower 43 and each pair of follower projections 40a relative to the associated cam groove 12b and the associated cam protrusion 24d vary after focusing operation has been performed, the subsequent zooming operation becomes slightly different from the previous zooming operation. For instance, assuming that during standby each spherical follower 43 and the corresponding pair of follower projections 40a are positioned at a common circumferential position (C) (see FIGS. 19A and 19C) relative to the associated cam groove 12b and the associated cam protrusion 24d, respectively, when focus is set at a certain focal length (e.g., when focus is set at infinity), if the second lens frame 12 is turned to bring the object at a finite distance into focus, each spherical follower 43 moves to a position (D) in the associated cam groove 12b, whereas the corresponding pair of follower projections 40a does not move from the position (C). As a consequence, each spherical follower 43 and the corresponding pair of follower projections 40a are positioned at different circumferential positions, respectively. When a zooming operation is carried out, each pair of follower projections 40a is prevented from moving in the optical axis direction by the associated lead protrusion 17b, whereas each spherical follower 43 is not prevented from moving in the optical axis. Therefore, in this state, if the zoom ring 19 is turned to vary focal length, the follower ring 40 rotates along the set of three cam protrusions 24d, and at the same time, the three spherical followers 43 move in the optical axis direction while being guided by the three cam grooves 12b, respectively. This changes the relative position between the second lens frame 12 and the second lens group moving frame 24, and the second lens frame 12 that supports the second lens group L2 moves to an axial position where focus is achieved, which corresponds to the focal length determined by the rotational position of the first cam ring 23 relative to the inner stationary barrel 17. Accordingly, even if a zooming operation is performed in an in-focus state for the object at a certain distance, focal length of the varifocal lens can be varied while maintaining the in-focus state relative to the object because the set of three cam grooves 12b and the set of three cam protrusions 24d are shaped to compensate a slight focus variation caused by zooming operation.

A method of determining the contour of the camming portion of each of the cam grooves 12b and the cam protrusions 24d will be hereinafter discussed with reference to FIGS. 27 through 30.

Figure 27:
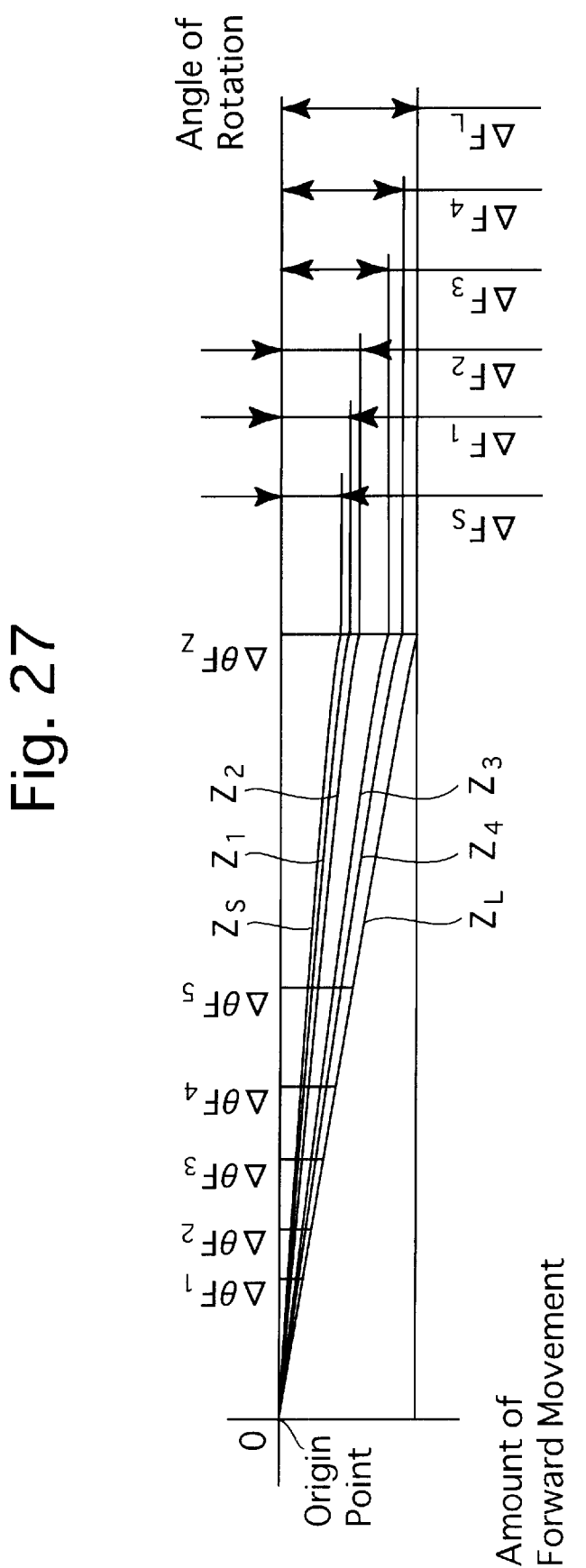
FIG. 27 is a graph showing curves which represent the relationships between the angle of rotation of a focus ring and the amount of forward movement of the second lens frame 12 (the second lens group L2) at different focal lengths.
Figure 28:
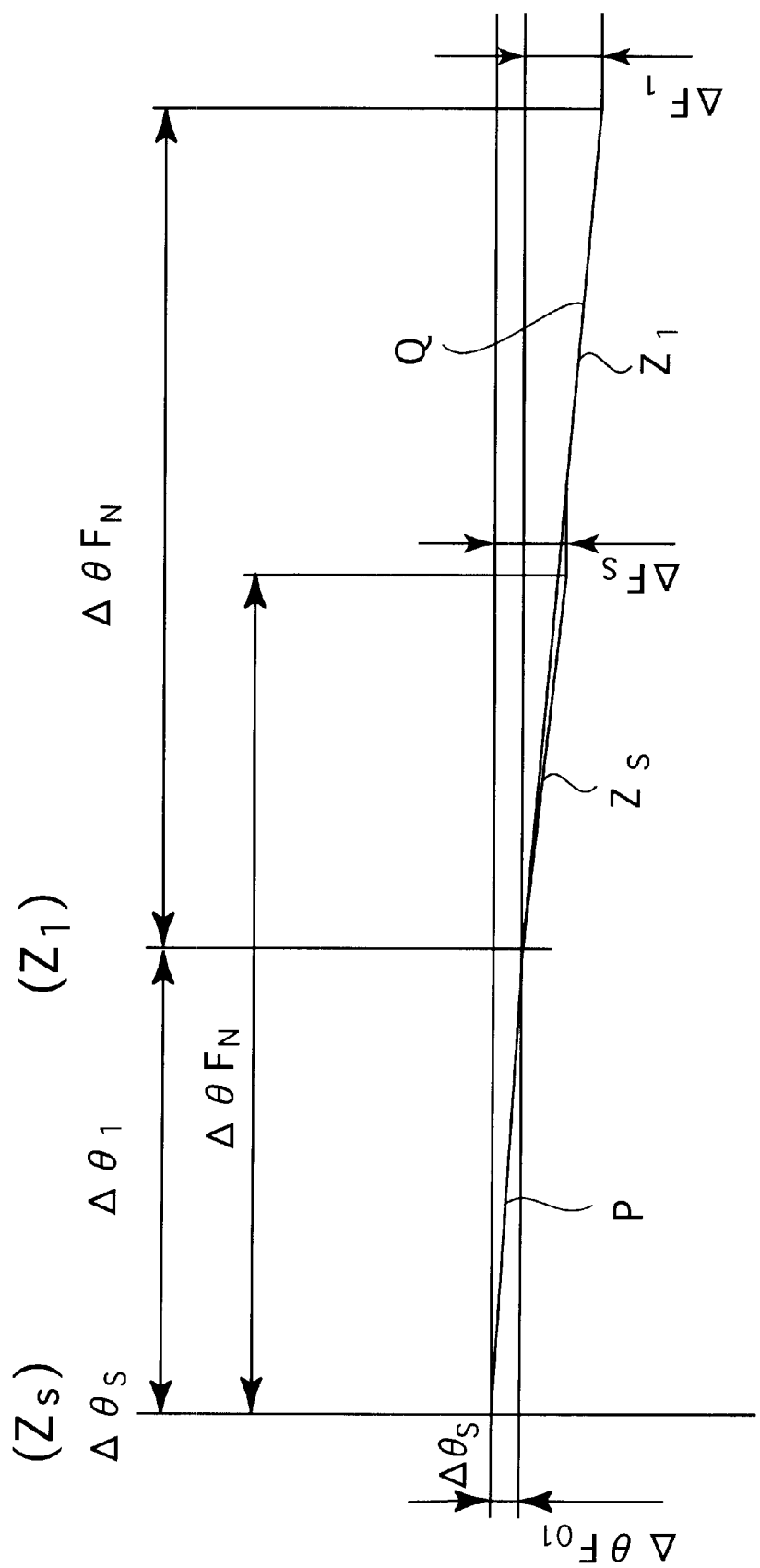
FIG. 28 is an explanatory diagram showing a procedure for arranging each curve shown in FIG. 27 so that the origin point thereof coincides with the corresponding angle of rotation of a zoom ring of the varifocal lens barrel.
Figure 29:
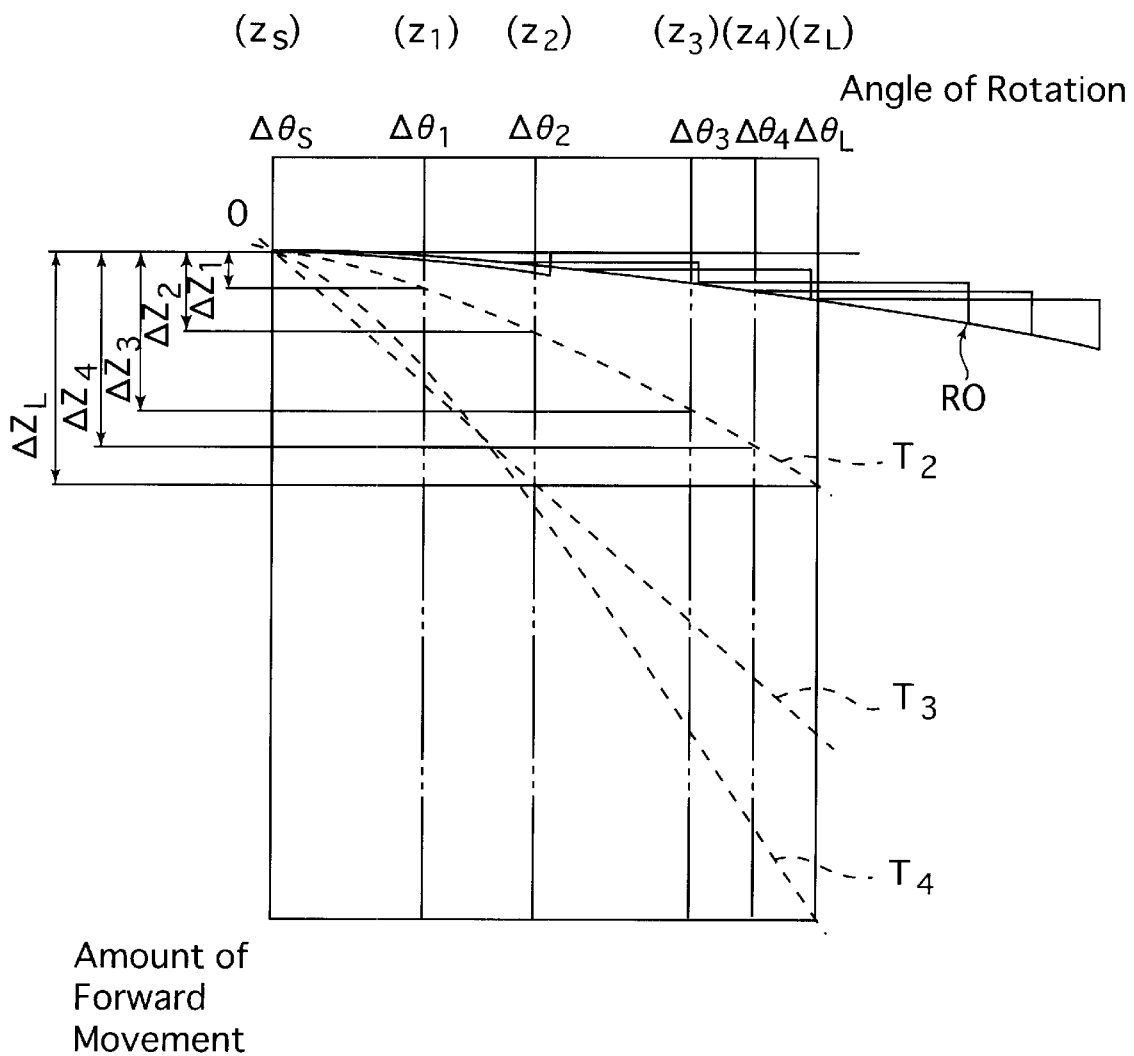
FIG. 29 is a graph showing a group of curves obtained via the arranging procedure shown in FIG. 28, and further showing the relationship between the angle of rotation of the zoom ring and the amount of movement of each of the first, second and third lens groups, and also the moving paths of the first, second and third lens groups when zooming operation is performed.
Figure 30:
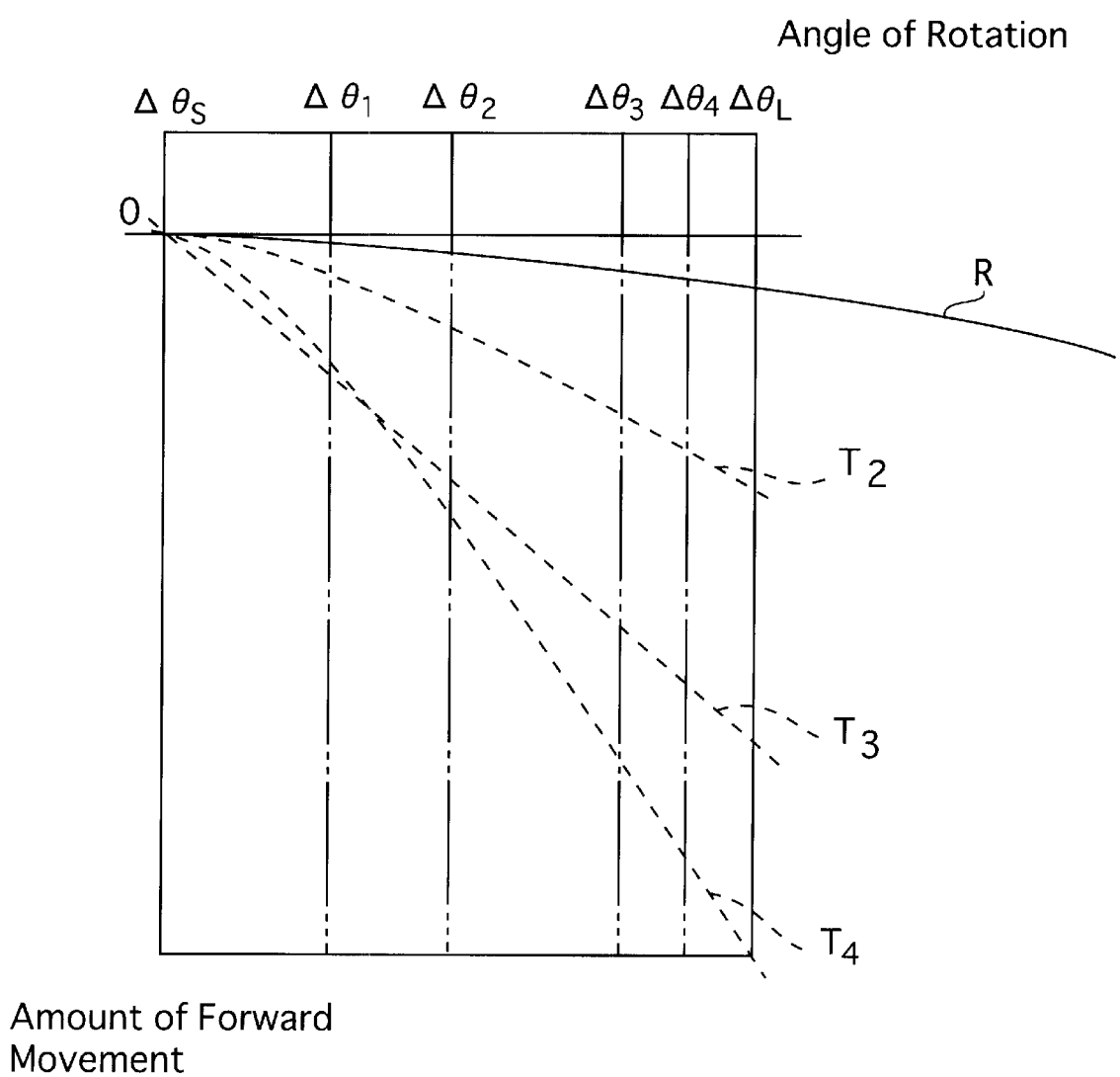
FIG. 30 is a graph showing a continuous curve obtained by joining all the origin points of the group of curves shown in FIG. 29.

FIG. 27 is a graph showing curves which represent the relationships between the angle of rotation of the focus ring 18 ($\Delta\theta F_1 \sim \Delta F_N$) and the amount of forward movement of the second lens frame 12 (i.e., the second lens group L2) ($\Delta F_S$, $\Delta F_1 \sim \Delta F_4$, $\Delta F_L$) from the standby position thereof (from infinity to a close distance) at different focal lengths ($Z_S \sim Z_L$), wherein the origin point of the graph corresponds to an infinite position (amount of forward movement=0). In FIG. 27, $Z_S$ and $Z_L$ represent focal lengths at the wide-angle extremity and the telephoto extremity, respectively, while $Z_1$ through $Z_4$ represent intermediate focal lengths between the wide-angle extremity $Z_S$ and the telephoto extremity $Z_L$ which are adequately selected to determine the contour of the camming portion of each of the cam grooves 12b and the cam protrusions 24d. If the curves obtained at the six different focal lengths ($Z_S$, $Z_1$, $Z_2$, $Z_3$, $Z_4$ and $Z_L$) in FIG. 27 are arranged so as to correspond to the corresponding angles of rotation $\Delta\theta_S$, $\Delta\theta_1$, $\Delta\theta_2$, $\Delta\theta_3$, $\Delta\theta_4$ and $\Delta\theta_L$) of the zoom ring 19, respectively, a graph shown in FIG. 29 is obtained. FIG. 29 shows the relationship between the angle of rotation of the zoom ring 19 and the amount of movement of each of the first, second and third lens groups L1, L2 and L3, and also the moving paths of the first, second and third lens groups L1, L2 and L3 when zooming operation is performed. In FIG. 29, $T_2$, $T_3$ and $T_4$ represent the moving paths of the first, second and third lens groups L1, L2 and L3, respectively. A procedure for arranging curves in the graph shown in FIG. 29 will be hereinafter discussed. For instance, as shown in FIG. 28, in the case of arranging a curve P at focal length $Z_S$ and another curve Q at focal length $Z_1$, the arranging procedure can be such that, firstly the curve P is arranged with the origin point thereof coinciding with the corresponding angle of rotations $\Delta\theta_S$ (the origin point) of the zoom ring 19, and subsequently the curve Q is arranged with the origin point thereof coinciding with the corresponding angle of rotation $\Delta\theta_1$ of the zoom ring 19. If the remaining curves at focal lengths $Z_2$, $Z_3$, $Z_4$ and $Z_L$ can be arranged in the same procedure, a group of curves R0 (see FIG. 29), as a result of arranging all the six curves in the aforementioned manner, is obtained. If all the origin points of the group of curves R0 are joined, a continuous curve R shown in FIG. 30 is obtained. It should be noted that the scale of the horizontal axis shown in FIGS. 29 and 30 which indicates the angle of rotation of the zoom ring 19 is determined so that the continuous curve R becomes a smooth curve.

If the shape of the continuous curve R shown in FIG. 30 is used as the contour of each of the cam grooves 12b and the cam protrusions 24d, the second lens frame 12 (the second lens group L2) can be driven to move in the above described moving pattern. Since the continuous curve R shown in FIG. 30 is obtained by joining all the origin points of the group of curves R0 that respectively correspond to axial positions of the second lens frame 12 (the second lens group L2) when focus is set at infinity at different focal lengths, a precise axial position of the second lens frame 12 (the second lens group L2) to achieve focus when focused at infinity can be reliably obtained at all focal lengths. However, when focused at a finite distance, the amount of forward movement of the second lens frame 12 (the second lens group L2) from the standby position thereof includes a slight error since the continuous curve R is an approximation. Considering this error, the contour of the camming portion of each of the cam grooves 12b and the cam protrusions 24d is determined so that the error falls within tolerance (i.e., a depth of field) by changing the maximum angle of rotation $\Delta\theta F_N$ of the focusing ring 18. Accordingly, with such a contour of the camming portion of each of the cam grooves 12b and the cam protrusions 24d, the second lens frame 12 (the second lens group L2) can be driven to move to a precise position wherein an in-focus position is achieved at infinity, and the second lens frame 12 (the second lens group L2) can be driven to move to a position close to the precise position where focus is achieved within depth of field even when focus is set at a finite distance.

If autofocus operation is performed by driving the AF coupler 72 of the camera body 70, the focus ring 18 only needs to be driven to rotate through an angle of rotation corresponding to the amount of depth of field. The angle of rotation of the focus ring 18 is constant at all focal lengths if the amount of depth of field is constant.

In the extending guide mechanism (adjustment mechanism/cam mechanism) positioned between the second lens frame 12 and the follower ring 40 which includes the three cam grooves 12b and the three spherical followers 43, each spherical follower 43 is biased against the associated cam groove 12b by the associated biasing member 45 as has been described above. Biasing each spherical follower 43 against the associated cam groove 12b in a such a manner makes a smooth relative rotation between the second lens frame 12 and the follower ring 40 possible to thereby give the above described precise movement to the second lens group L2. Specifically, in the present embodiment of the varifocal lens barrel, the spherical followers 43 respectively slide on the cam grooves 12b therealong during not only a focusing operation, but also during a zooming operation, so that the frequency of use of the cam grooves 12b is high. Due to this reason, it is advantageous to form each of the followers which are respectively engaged in the cam grooves 12b as a spherical follower or a ball so as to achieve a smooth movement thereof in the associated cam groove 12b.

Each spherical follower 43 can be made of metal or synthetic resin. Each cam groove 12b can be formed at the time the second lens frame 12 is molded of synthetic resin, or the second lens frame 12 together with the cam grooves 12b can be made of metal. It is possible for a major portion of the second lens frame 12 to be made of synthetic resin while the remaining portion, which includes the cam grooves 12b, is made of metal to be fixed to the outer peripheral surface of the major part of the second lens frame 12. The cost of production is reduced if the second lens frame 12 is made up of a small number of molded parts, and the strength and resistance to abrasion increase if the amount of metal used to form camming portions of the second lens frame 12 increases.

Figure 20:
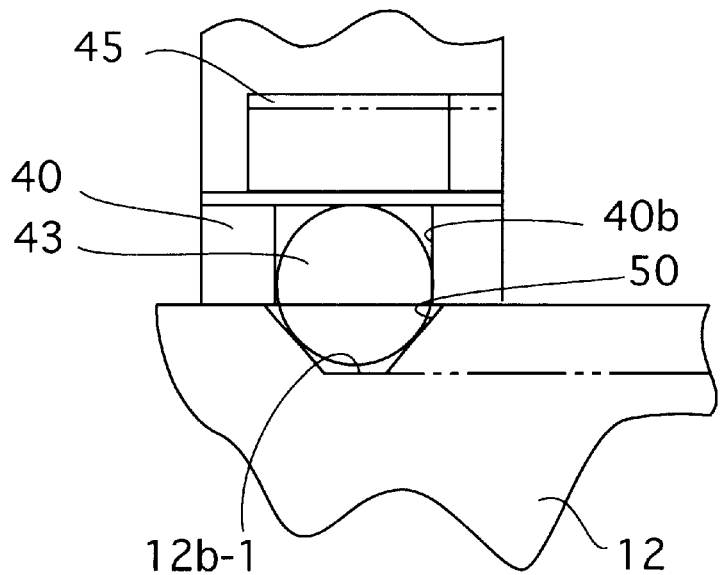
FIG. 20 is a cross sectional view of a fundamental portion of an extending guide mechanism including the second lens frame shown in FIG. 19C and the follower ring shown in FIG. 19B, showing an embodiment of a structure of an engaging portion between each spherical follower and the associated cam groove.
Figure 21:
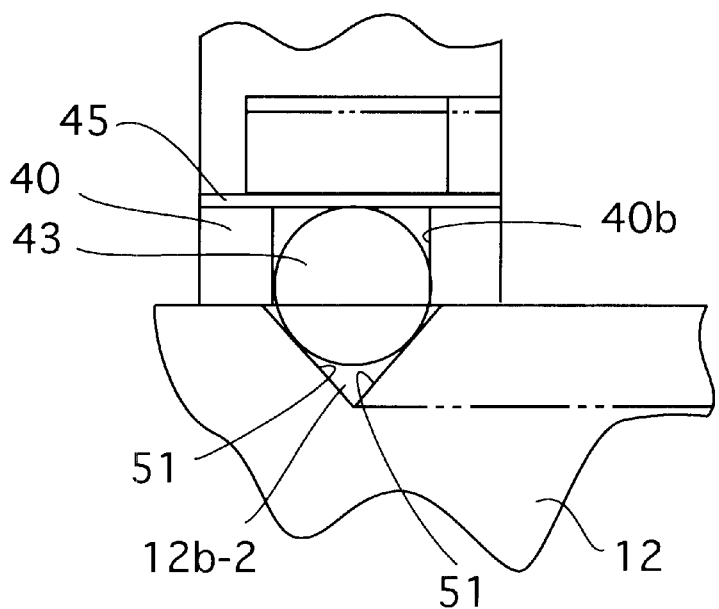
FIG. 21 is a view similar to that of FIG. 20, showing another embodiment of the structure of the engaging portion between each spherical follower and the associated cam groove.
Figure 22:
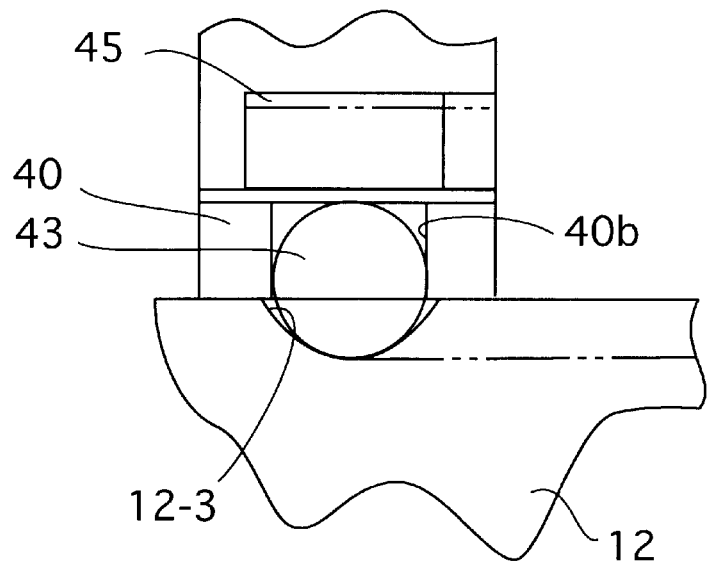
FIG. 22 is a view similar to that of FIG. 20, showing yet another embodiment of the structure of the engaging portion between each spherical follower and the associated cam groove.

The cross sectional shape of each cam groove 12b is not limited solely to a particular shape. FIGS. 20 through 22 show different embodiments of the cross sectional shape of each cam groove 12b. FIG. 20 shows a cam groove 12b (12b-1) having a trapezoidal cross section. FIG. 21 shows a cam groove 12b (12b-2) having a V-shaped cross section. FIG. 22 shows a cam groove 12b (12b-3) having a circular arc cross section. In each of these three cam grooves 12b-1, 12b-2 and 12b-3, the width of the cam groove increases in a radial outward direction from bottom to top, i.e., in the upward direction as viewed in each of FIGS. 20, 21 and 22. In the embodiments shown in FIGS. 20 and 21, each spherical follower 43 comes into point-contact with respective beveled surfaces 50 or 51, and therefore does not come into contact with the bottom of each cam groove 12b-1 or 12b-2. Comparing the embodiment shown in FIG. 20 with the embodiment shown in FIG. 21, it is desirable to adopt the embodiment shown in FIG. 20 to reduce the wall thickness of the second lens frame 12 because the depth of the cam groove 12b-1 is smaller than that of the cam groove 12b-2. In the embodiment shown in FIG. 22, each cam groove 12b-3 is formed having a circular arc cross section corresponding to the shape of a surface of the spherical follower 43 so that each spherical follower 43 comes into line (arc line) contact with the associated cam groove 12b-3. This increases a range of contact between each cam groove 12b and the associated spherical follower 43 to thereby achieve stable and smooth slide guidance.

In the extending guide mechanism (cam mechanism) positioned between the second lens frame 12 and the follower ring 40, tilt, eccentricity and axial positional deviation of the second lens group L2 are effectively prevented from occurring because each spherical follower 43 is biased against the associated cam groove 12b by the associated biasing member 45. Specifically, each biasing member 45 removes play between each cam groove 12b and the associated spherical follower 43. In addition, pressure is exerted on the second lens frame 12 equally from the three supporting points toward the center of the second lens frame 12 (i.e., toward the optical axis O) because the three spherical followers 43 are arranged at equi-angular intervals (i.e., at intervals of 120 degrees), in a circumferential direction of the follower ring 40, and because each biasing member 45 biases the associated spherical follower 43 radially inwards so that the three spherical followers 43 come into pressing contact with the three cam grooves 12b, respectively. This structure precisely centers the second lens frame 12 with respect to the optical axis O, thus preventing eccentricity of the second lens group L2 from occurring. Moreover, tilt and axial positional deviation of the second lens group L2 are also effectively prevented from occurring because each biasing member 45 removes play between each cam groove 12b and the associated spherical follower 43 as described above.

FIGS. 23 through 26 show different embodiments of the biasing member 45 and the supporting structure thereof. In the embodiment shown in FIG. 23, three cantilever leaf springs 45-1 are used as the three biasing members 45. The follower ring 40 is provided on a rear surface thereof with three recesses 55 in which the three cantilever leaf springs 45-1 are respectively positioned. The follower ring 40 is provided in each of the three recesses 55 with a pair of opposed protrusions 56 and 57 which are formed to hold one end of the associated cantilever leaf springs 45-1 therebetween. Accordingly, the three cantilever leaf springs 45-1 are fixed to the follower ring 40 in the three recesses 55 via the three pairs of opposed protrusions 56 and 57, respectively. The other end of each cantilever leaf spring 45-1 is a free end which presses the associated spherical follower 43 against the associated cam groove 12b radially inwards.

Figure 23:
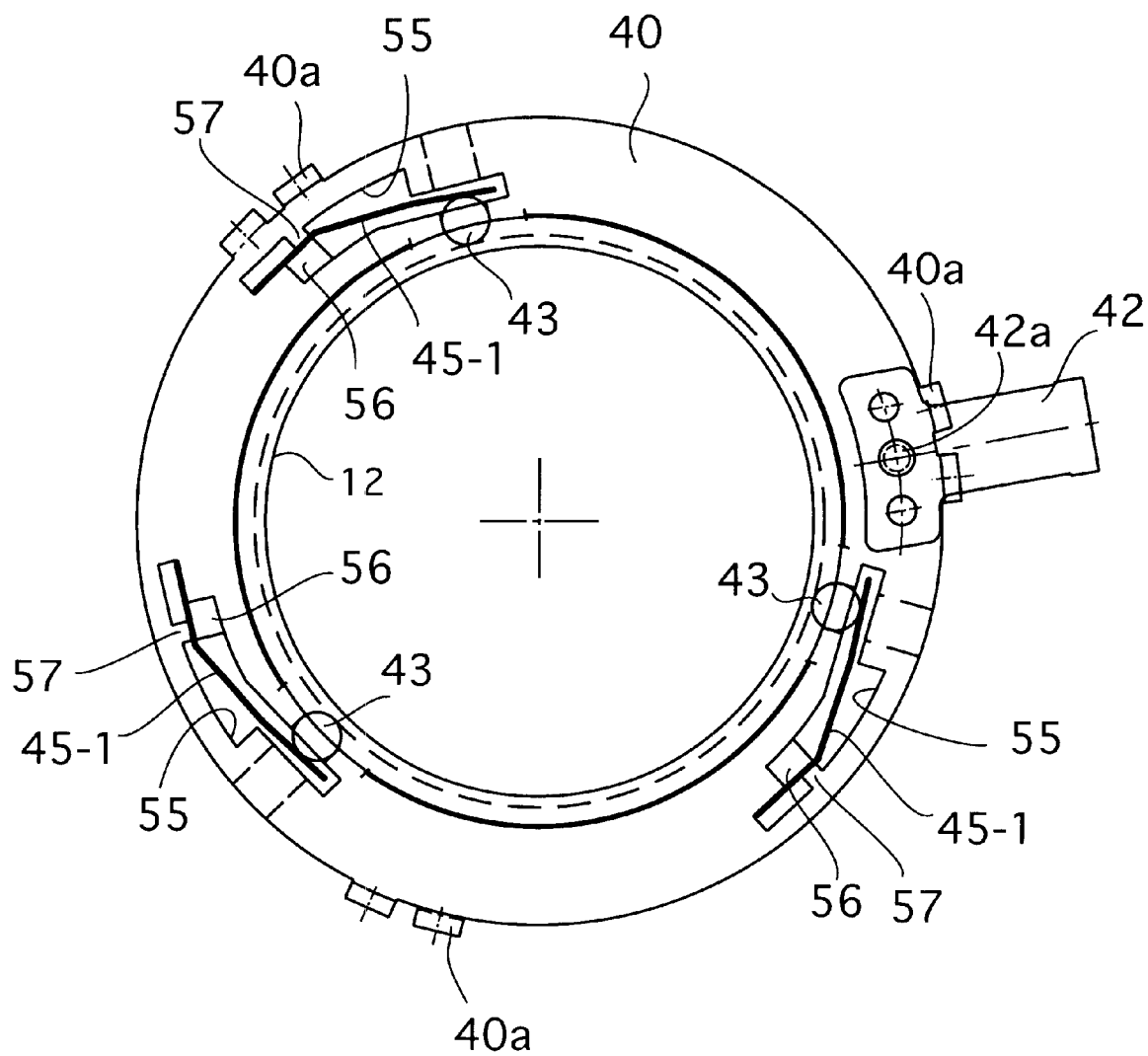
FIG. 23 is a rear elevational view of an assembly including the second lens frame shown in FIG. 19C and the follower ring shown in FIG. 19B to which the biasing members and the spherical followers are fixed, showing an embodiment of a combination of each biasing member and the supporting structure thereof.
Figure 24:
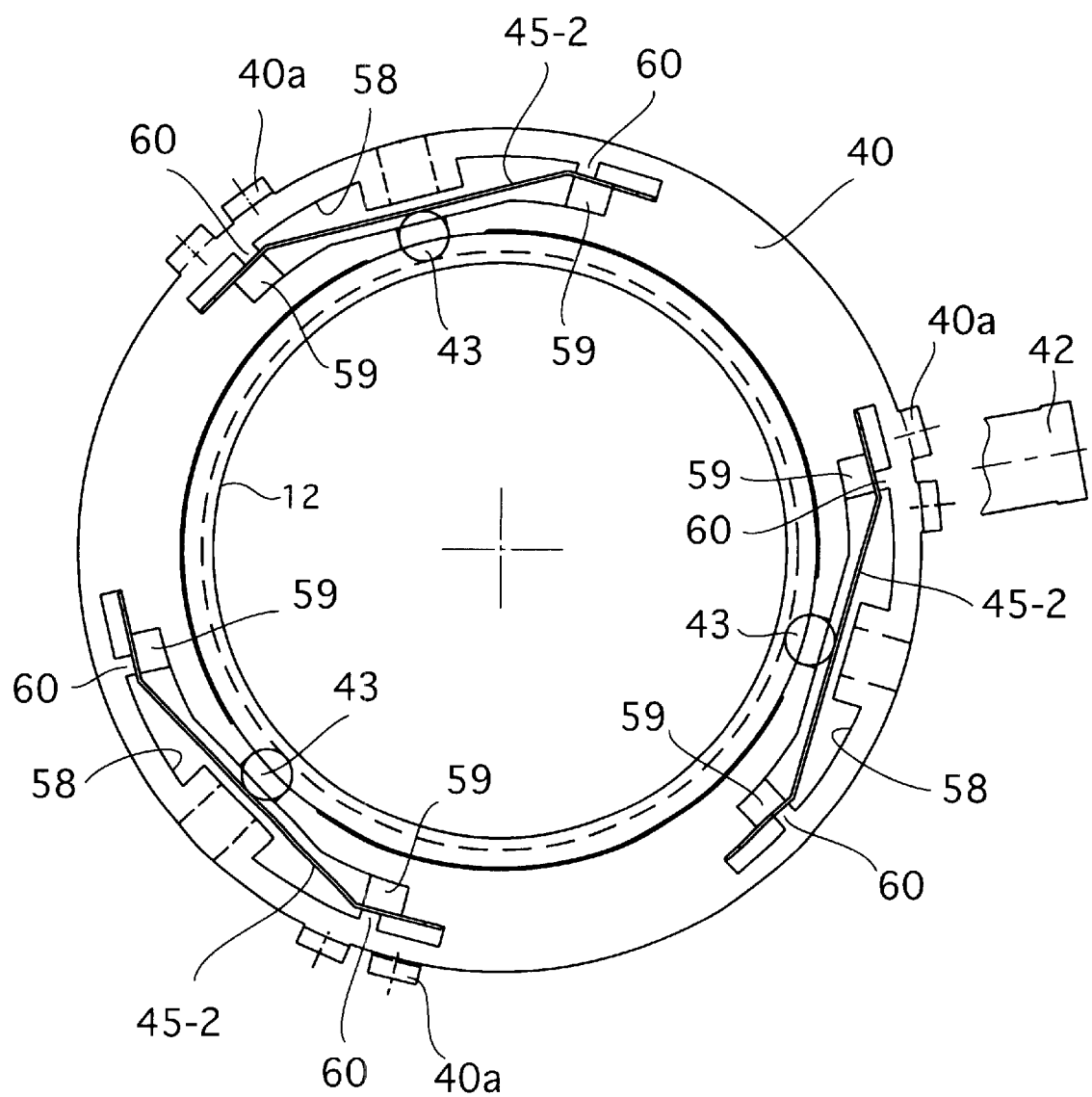
FIG. 24 is a view similar to that of FIG. 23, showing another embodiment of a combination of each biasing member and the supporting structure thereof.

In the embodiment shown in FIG. 24, three leaf springs 45-2 are used as the three biasing members 45. The follower ring 40 is provided on a rear surface thereof with three recesses 58 in which the three leaf springs 45-2 are respectively positioned. Unlike the structure shown in FIG. 23, the follower ring 40 is provided in each of the three recesses 58 with two pairs of opposed protrusions 59 and 60. One pair of these two pairs opposed protrusions 59 and 60 are formed to hold one end of the associated cantilever leaf springs 45-2 therebetween, while the other pair are formed to hold the other end of the associated cantilever leaf springs 45-2 therebetween. Accordingly, each of the three leaf springs 45-2 is fixed to the follower ring 40 in the associated recess 58 via the two pairs of opposed protrusions 59 and 60. A central portion of each leaf spring 45-2 presses the associated spherical follower 43 against the associated cam groove 12b radially inwards.

In the embodiments shown in FIGS. 23 and 24, each biasing member 45 is formed as a leaf spring (45-1 or 45-2), and the follower ring 40 is provided with a holding portion (56 and 57, or 59 and 60) which holds the leaf spring. This structure does not require any additional fixing members for fixing each biasing member to the follower ring 40, thus reducing the cost of production. Moreover, such a structure improves the workability in assembly and disassembly of the variable lens barrel 1 since each leaf spring (45-1 or 45-2) can be fixed to the follower ring 40 by simply inserting one leaf spring into each recess 55 or 58. In addition, the embodiment shown in FIG. 23 is more desirable than that shown in FIG. 24 for reducing space for positioning one biasing member 45 in each recess 55 or 58 in a radial direction of the follower ring 40 to thereby reduce the thickness of the follower ring 40. Each spring leaf 45-1 and 45-2 is desirably made of metal for strength, but can be made of synthetic resin if sufficient strength is ensured.

Figure 25:
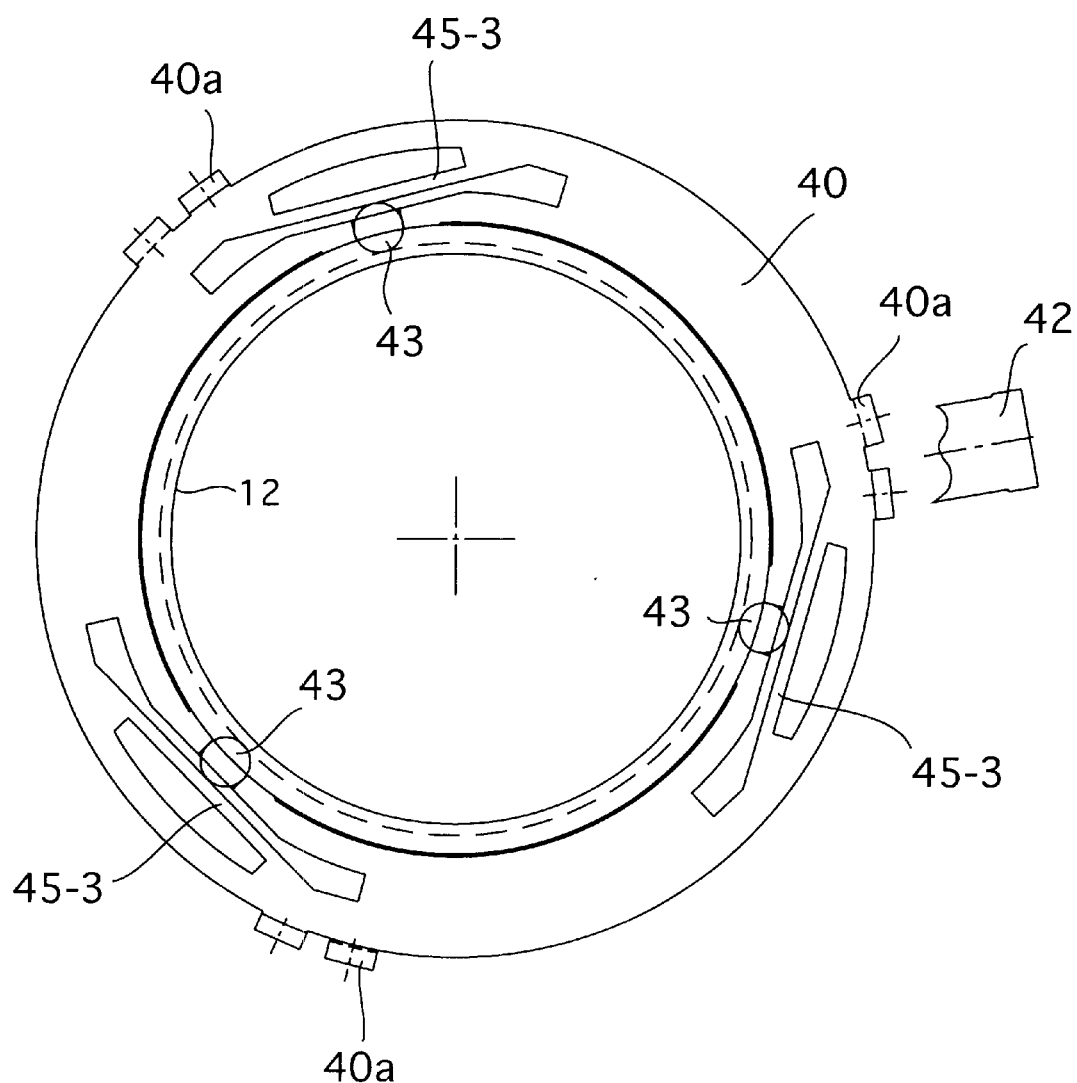
FIG. 25 is a view similar to that of FIG. 23, showing another embodiment of a combination of each biasing member and the supporting structure thereof.

In the embodiment shown in FIG. 25, three leaf spring portions 45-3, each of which is formed as part of the follower ring 40, are used as the three biasing members 45. Each leaf spring portion 45-3 is formed thin so as to have resiliency. An inner surface of each leaf spring portion 45-3 is in pressing contact with the associated spherical follower 43. In an assembled state shown in FIG. 25, each spherical follower 43 presses the associated leaf spring portion 45-3 radially outwards so that each leaf spring portion 45-3 becomes resiliently deformed slightly while pressing the associated spherical follower 43 radially inwards by the resilient force thereof. The three leaf spring portions 45-3 can be made of synthetic resin, and can be formed integral with the follower ring 40 if the follower ring 40 is molded from synthetic resin. Alternatively, the three leaf spring portions 45-3 can be made of metal to be formed integral with the follower ring 40 if the follower ring 40 is formed from metal. The embodiment shown in FIG. 25 can be adopted to effectively reduce the number of elements of the varifocal lens barrel 1 since the biasing members 45 (45-3) do not have to be provided as separate members independent of the follower ring 40.

Figure 26:
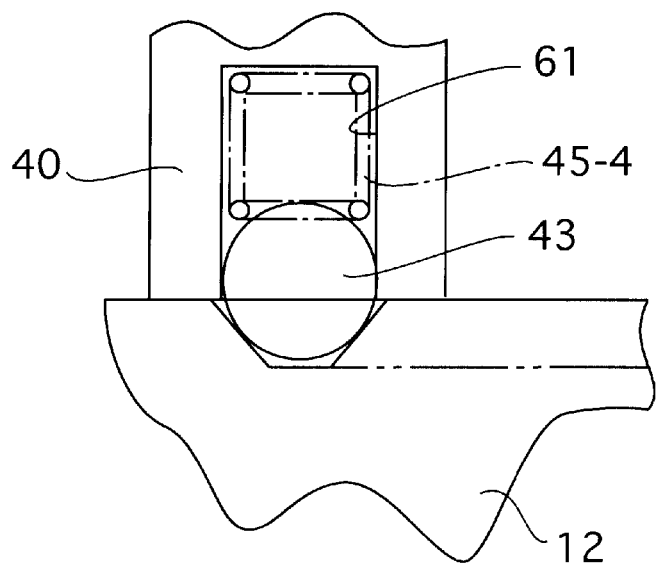
FIG. 26 is a fragmentary cross sectional view of an assembly similar to that shown in FIG. 20, showing another embodiment of a combination of each biasing member and the supporting structure thereof.

In the embodiment shown in FIG. 26, three helical compression springs 45-4 (only one of them is shown in FIG. 26) are used as the three biasing members 45. The follower ring 40 is provided on an inner peripheral surface thereof with three bottomed holes (radial hole) 61 in each of which one helical compression spring 45-4 and one spherical follower 43 are inserted in that order. One end (the upper end as viewed in FIG. 26) of each helical compression spring 45-4 is in contact with the bottom of the associated bottomed hole 61, while the other end is in contact with the associated spherical follower 43. Each helical compression spring 45-4 can be compressed and returned to its original shape in the associated bottomed hole 61. In an assembled state shown in FIG. 26, each spherical follower 43 is pressed into the associated bottomed hole 61 against the spring force of the associated helical compression spring 45-4 so that it is slightly compressed.

As can be understood from the above descriptions, according to the varifocal lens barrel to which the present invention is applied, a movable lens group (the second lens group L2) can be driven to move precisely and smoothly, and at the same time, tilt, eccentricity, and axial positional deviation of the movable lens group can be prevented from occurring because an extending guide mechanism for the movable lens group includes a set of guiding grooves and a set of spherical followers which are respectively engaged in the set of guiding grooves. It is highly effective to apply this mechanism to a varifocal lens barrel such as shown in FIGS. 1 and 2, the image performance of which is generally sensitive to tilt, eccentricity and axial positional deviation of the focusing lens group of the varifocal lens barrel.

The present invention is not limited solely to the above described particular embodiment of the varifocal lens barrel. For instance, from the view point of prevention of occurrence of tilt, eccentricity and axial positional deviation of a movable lens group by precise guiding of the movable lens group, a lead groove having a linear contour instead of a cam groove having a non-linear contour can be adopted as each groove with which a spherical follower is in pressing contact via a biasing member. Namely, the present invention can be widely applied to various extending guide mechanisms for driving a lens group such as a cam mechanism or a lead mechanism. For instance, the three rib-like lead protrusions 17b and the three pairs of follower projections 23a can be replaced by three lead grooves each having a linear contour and three spherical followers, respectively, wherein each spherical follower can be made to be pressed against the associated lead groove.

Although guide grooves (cam grooves 12b) are formed on a lens frame (the second lens frame 12) while spherical followers (43) are provided on a guide ring (the follower ring 40), the guide grooves can be formed on the guide ring while spherical followers are provided on the lens frame. In addition, the lens frame (the second lens frame 12) and the guide ring (the follower ring 40) only have to be designed so that the lens frame (the second lens frame 12) advances by a relative rotation between the lens frame (the second lens frame 12) and the guide ring (the follower ring 40). For instance, the lens frame can be linearly guided in the optical axis direction without rotating about the optical axis so that the lens frame is moved in the optical axis direction by engagement of a set of guide grooves (cam grooves or lead grooves) with a corresponding set of spherical followers when the guide ring rotates.

As can be understood from the above description, according to the present invention, a varifocal lens barrel in which tilt, eccentricity and axial positional deviation of a focusing lens group are prevented from occurring is achieved, while smooth movement of the focusing lens group is ensured to thereby achieve a stable image performance. Moreover, tilt, eccentricity and axial positional deviation of not only a focusing lens group of a varifocal lens barrel, but also any other movable lens group are prevented from occurring while a smooth movement of the movable lens group is ensured to thereby achieve a stable image performance.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A varifocal lens barrel comprising:
   a varifocal optical system having a plurality of movable lens groups which are driven to move in the optical axis direction to vary a focal length, wherein said plurality of movable lens groups include a focusing lens group which is moved by different amounts of movement at different focal lengths, respectively, when focusing on an object at a fixed distance;
   a focus operation ring which is manually rotatable;
   a focus lens frame which supports said focusing lens group, said focus lens frame being rotated via rotation of said focus operation ring;
   a guide ring positioned around said focus lens frame;
   a bottomed focusing cam groove having a non-linear contour which is formed on one of an outer peripheral surface of said focus lens frame and an inner peripheral surface of said guide ring;
   a spherical follower which is supported by the other of said outer peripheral surface of said focus lens frame and said inner peripheral surface of said guide ring, said spherical follower being movable in a radial direction of said focus lens frame and said guide ring and slidably engaged in said bottomed focusing cam groove so as to move said focus lens frame in said optical axis direction in accordance with said non-linear contour when said focus lens frame is rotated by rotation of said focus operation ring;
   a biasing member for pressing said spherical follower against said bottomed focusing cam groove; and
   an adjustment mechanism which varies a relative moving range of said spherical follower in said bottomed focusing cam groove, in a circumferential direction of said guide ring, in accordance with a variation of said focal length to vary an amount of movement of said focusing lens group per unit of rotation of said focus operation ring in accordance with said focal length.

2. The varifocal lens barrel according to claim 1, further comprising:
   a zoom operation ring which is manually rotatable independently of said focus operation ring;
   an intermediate movable frame which supports said focusing lens group via said guide ring, said intermediate movable frame being guided in said optical axis direction without rotating about said optical axis; and
   a zoom drive ring which moves said plurality of movable lens groups and said intermediate movable frame in said optical axis direction in a predetermined moving pattern via rotation of said zoom operation ring;
   wherein said adjustment mechanism comprises:
      a rotation transfer member via which rotation of said zoom drive ring is transferred to said guide ring to rotate said zoom drive ring and said guide ring together about said optical axis while allowing said guide ring to move in said optical axis direction relative to said zoom drive ring;
      an adjustment cam portion having a non-linear contour which is formed on one of opposed peripheral surfaces of said intermediate movable frame and said guide ring, said non-linear contour of said adjustment cam portion being to the same as said non-linear contour of said bottomed focusing cam groove; and
      an adjustment follower formed on the other of said opposed peripheral surfaces of said intermediate movable frame and said guide ring to be engaged with said adjustment cam portion;
   wherein said guide ring rotates about said optical axis while moving in said optical axis direction relative to each of said focus lens frame and said intermediate movable frame by same angle of rotations about said optical axis and by same amounts of movement in said optical axis direction to thereby vary said position of engagement of said spherical follower with respect to said bottomed cam groove when said adjustment follower and said spherical follower are positioned at a common circumferential position relative to said adjustment cam portion and said bottomed cam groove, respectively.

3. The varifocal lens barrel according to claim 2, further comprising a stationary barrel which supports said zoom drive ring so that said zoom drive ring moves in said optical axis direction when rotated about said optical axis relative to said stationary barrel;
   wherein said zoom drive ring supports said intermediate movable frame so that said intermediate movable frame is rotatable about said optical axis relative to said zoom drive ring without moving in said optical axis direction relative to said zoom drive ring.

4. The varifocal lens barrel according to claim 1, wherein said bottomed focusing cam groove is formed on an outer peripheral surface of said focus lens frame, and wherein said spherical follower is provided on an inner peripheral surface of said guide ring.

5. The varifocal lens barrel according to claim 1, wherein said bottomed focusing cam groove comprises three bottomed cam grooves arranged at equi-angular intervals in the circumferential direction;
   wherein said spherical follower comprises three spherical followers arranged to correspond to said three bottomed focusing cam grooves; and
   wherein said biasing member comprises three biasing members arranged to correspond to said three spherical followers.

6. The varifocal lens barrel according to claim 1, wherein said bottomed focusing cam groove is formed to have a trapezoidal cross section so that a width of said each said bottomed focusing cam groove increases in a radial outward direction.

7. The varifocal lens barrel according to claim 1, wherein said bottomed focusing cam groove is formed to have a V-shaped cross section so that a width of said each said bottomed focusing cam groove increases in a radial outward direction.

8. The varifocal lens barrel according to claim 1, wherein said bottomed focusing cam groove is formed to have a circular arc cross section so that a width of said each said bottomed focusing cam groove increases in a radial outward direction.

9. The varifocal lens barrel according to claim 1, wherein said biasing member comprises a helical spring which is supported by one of said guide ring and said focus lens frame which supports said spherical follower.

10. The varifocal lens barrel according to claim 1, wherein said biasing member comprises a cantilever leaf spring, wherein one end of said cantilever leaf spring is fixed to one of said guide ring and said focus lens frame which supports said spherical follower.

11. The varifocal lens barrel according to claim 1, wherein said biasing member comprises a leaf spring, wherein opposite ends of said leaf spring are fixed to one of said guide ring and said focus lens frame which supports said spherical follower.

12. The varifocal lens barrel according to claim 10, wherein said one of said guide ring and said focus lens frame which supports said spherical follower comprises a holding portion which holds said one end of said cantilever leaf spring.

13. The varifocal lens barrel according to claim 11, wherein said one of said guide ring and said focus lens frame which supports said spherical follower comprises two holding portions which hold said opposite ends of said leaf spring, respectively.

14. The varifocal lens barrel according to claim 1, wherein said biasing member comprises a leaf spring portion which is formed integral with said one of said guide ring and said focus lens frame which supports said at least one spherical follower.

15. The varifocal lens barrel according to claim 1, wherein said spherical follower is made of metal.

16. The varifocal lens barrel according to claim 1, wherein said spherical follower is made of synthetic resin.

17. The varifocal lens barrel according to claim 1, wherein said biasing member is made of metal.

18. The varifocal lens barrel according to claim 1, wherein said biasing member is made of synthetic resin.

19. The varifocal lens barrel according to claim 1, wherein said bottomed focusing cam groove is formed integral with said one of said guide ring and said focus lens frame which supports said spherical follower, when said one of said guide ring and said focus lens frame which supports said spherical follower is molded of synthetic resin.

20. The varifocal lens barrel according to claim 1, wherein at least said bottomed focusing cam groove is made of metal.

21. A lens drive mechanism which moves a movable lens frame supporting a movable lens group in the optical axis direction by a relative rotation between said movable lens frame and a guide ring which are coaxially arranged, said lens drive mechanism comprising:
   a radial hole formed on one of said guide ring and said movable lens frame;
   a spherical follower inserted into said radial hole, said spherical follower being slidable in said radial hole;
   a guide groove formed on the other of said guide ring and said movable lens frame; and
   a biasing member which biases said spherical follower in a direction to come into pressing contact with said guide groove.

22. The lens drive mechanism according to claim 21, wherein said guide groove comprises an operating portion having a non-linear contour.

23. The lens drive mechanism according to claim 21, wherein said guide groove comprises an operating portion having a linear contour.

24. The lens drive mechanism according to claim 21, wherein said guide groove comprises three guide grooves arranged at regular intervals in a circumferential direction;
   wherein said spherical follower comprises three spherical followers arranged at regular intervals in a circumferential direction; and
   wherein said biasing member comprises three biasing members arranged at regular intervals in a circumferential direction.

25. The lens drive mechanism according to claim 21, wherein said guide groove is formed so as to have a trapezoidal cross section, so that a width of said guide groove increases in a radial outward direction.

26. The lens drive mechanism according to claim 21, wherein said guide groove is formed so as to have a V-shaped cross section, so that a width of said guide groove increases in a radial outward direction.

27. The lens drive mechanism according to claim 21, wherein said guide groove is formed so as to have a circular arc cross section, so that a width of said guide groove increases in a radial outward direction.

28. The lens drive mechanism according to claim 21, wherein said biasing member comprises a helical spring which is supported by one of said guide ring and said movable lens frame which supports said spherical follower.

29. The lens drive mechanism according to claim 21, wherein said biasing member comprises a cantilever leaf spring, one end of which is fixed to one of said guide ring and said movable lens frame which supports said spherical follower.

30. The lens drive mechanism according to claim 21, wherein said biasing member comprises a leaf spring, wherein the opposite ends of said leaf spring are fixed to one of said guide ring and said movable lens frame which supports said spherical follower.

31. The lens drive mechanism according to claim 29, wherein said one of said guide ring and said movable lens frame which supports said spherical follower comprises a holding portion which holds said one end of said cantilever leaf spring.

32. The lens drive mechanism according to claim 30, wherein said one of said guide ring and said movable lens frame which supports said spherical follower comprises two holding portions which hold said opposite ends of said leaf spring, respectively.

33. The lens drive mechanism according to claim 21, wherein said biasing member comprises a leaf spring portion which is formed integral with said one of said guide ring and said movable lens frame which supports said spherical follower.

34. The lens drive mechanism according to claim 21, wherein said guide groove is formed on said movable lens frame, and wherein said spherical follower is provided on said guide ring.

35. The lens drive mechanism according to claim 21, wherein said spherical follower is made of metal.

36. The lens drive mechanism according to claim 21, wherein said spherical follower is made of synthetic resin.

37. The lens drive mechanism according to claim 21, wherein said biasing member is made of metal.

38. The lens drive mechanism according to claim 21, wherein said biasing member is made of synthetic resin.

39. The lens drive mechanism according to claim 21, wherein said guide groove is formed integral with said one of said guide ring and said movable lens frame which supports said spherical follower in the case where said one of said guide ring and said movable lens frame which supports said spherical follower is molded with synthetic resin.

40. The lens drive mechanism according to claim 21, wherein at least said guide groove is made of metal.

* * * * *